Jan. 5, 1937.  J. GRISENTI  2,066,527
GEAR SHIFTING APPARATUS
Filed Sept. 6, 1933   8 Sheets-Sheet 1
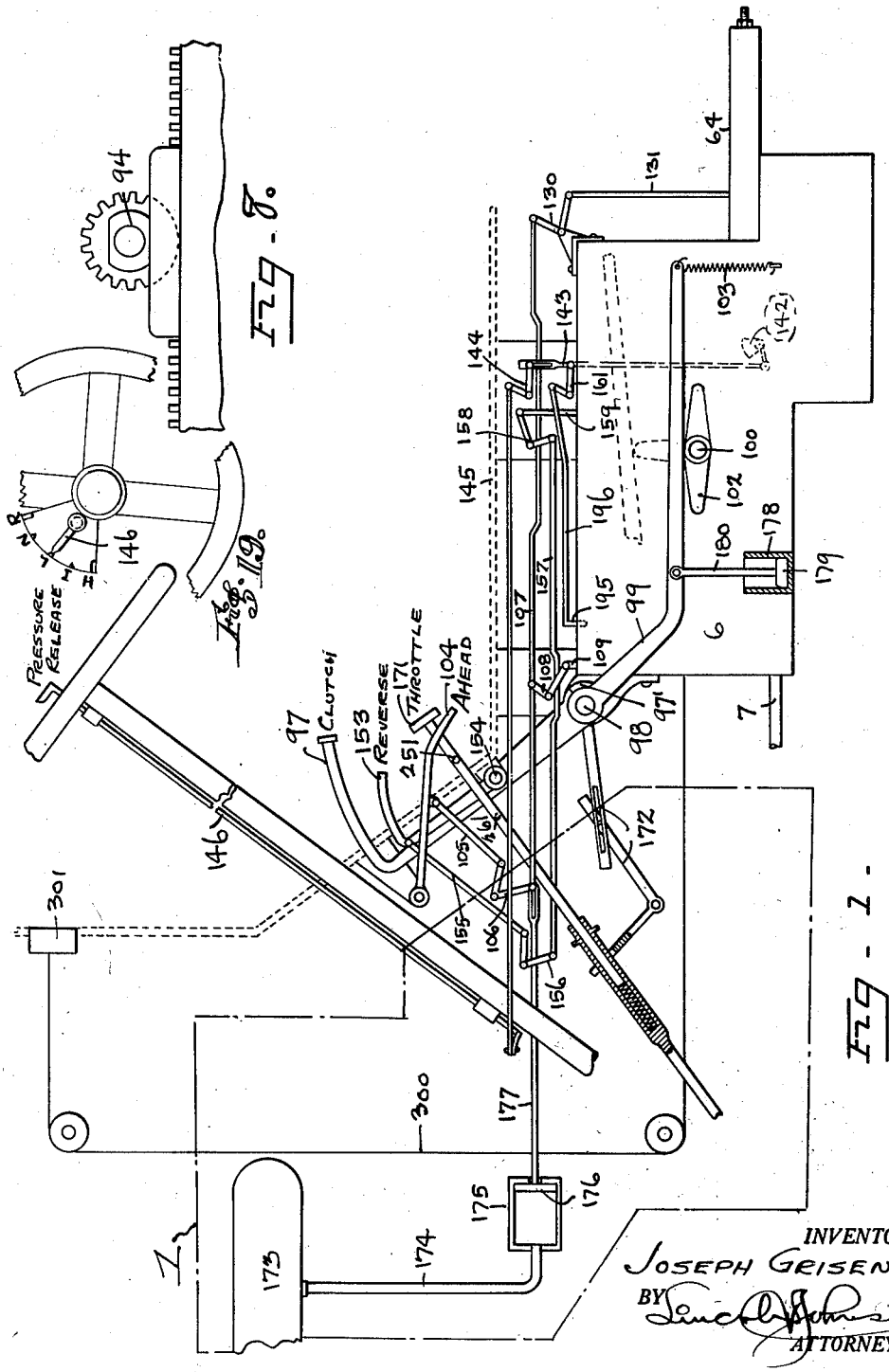
INVENTOR.
JOSEPH GRISENTI
BY
ATTORNEY

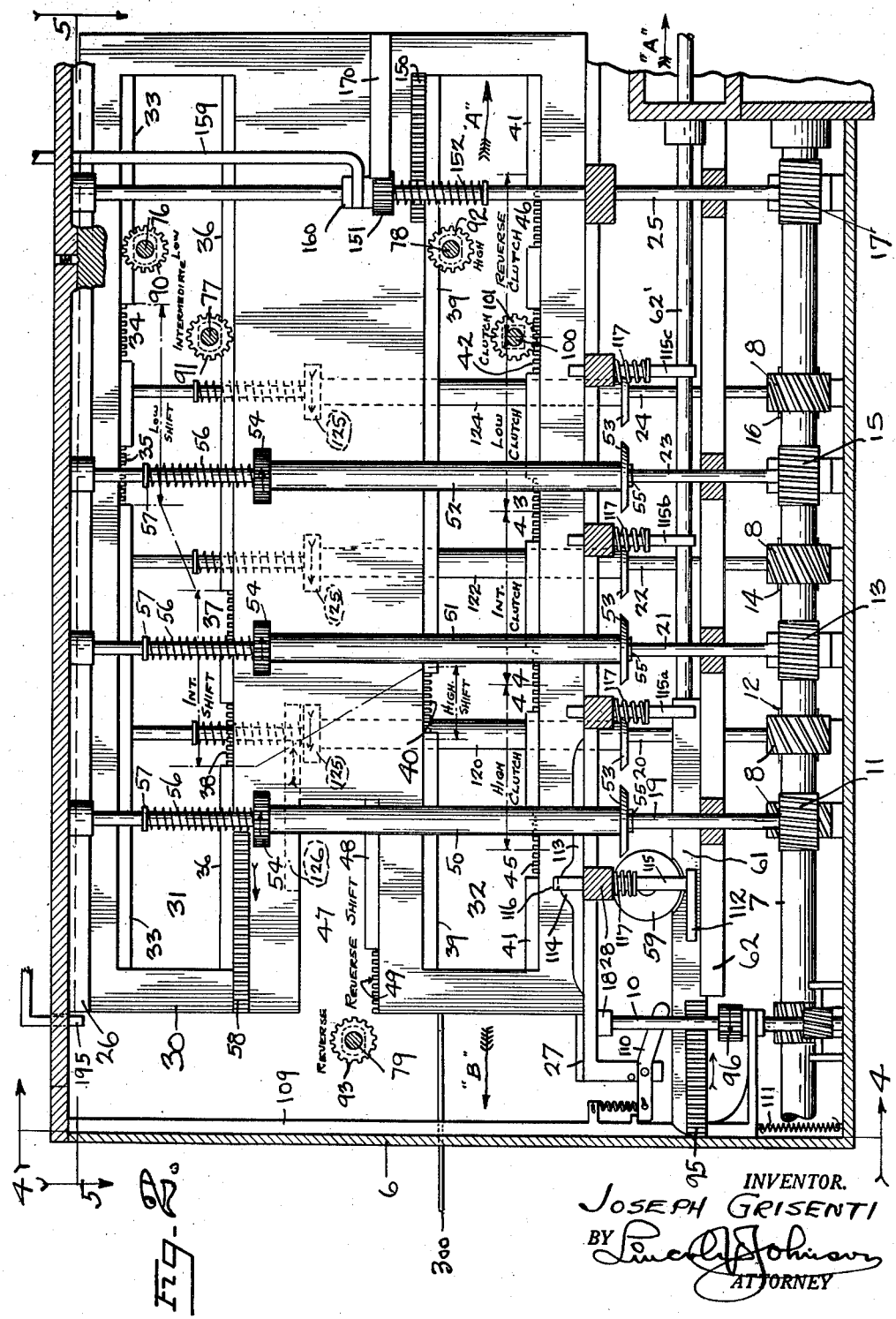

Jan. 5, 1937. J. GRISENTI 2,066,527
GEAR SHIFTING APPARATUS
Filed Sept. 6, 1933 8 Sheets-Sheet 3
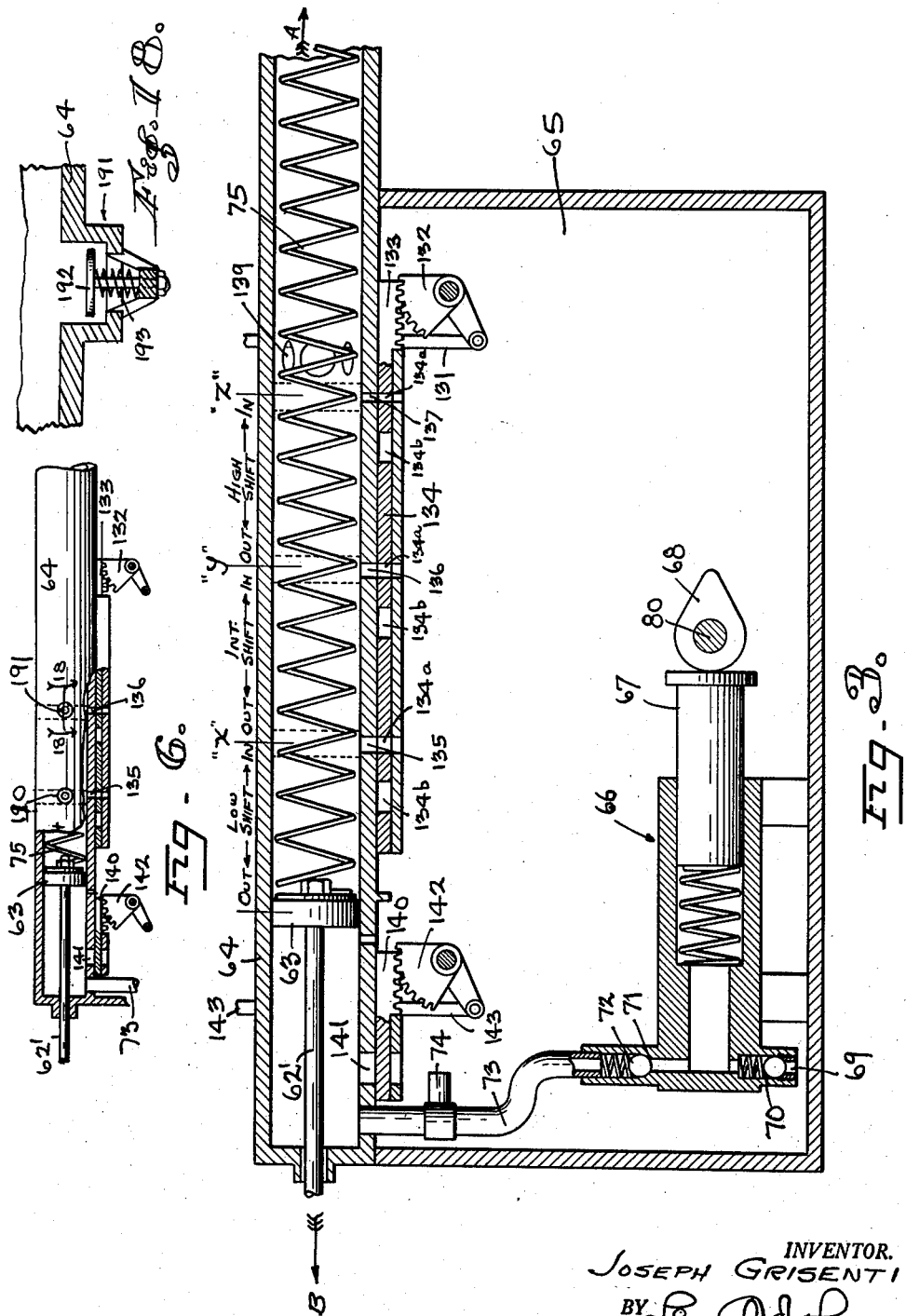
INVENTOR.
JOSEPH GRISENTI
BY
ATTORNEYS.

Jan. 5, 1937.　　　　J. GRISENTI　　　　2,066,527
GEAR SHIFTING APPARATUS
Filed Sept. 6, 1933　　　8 Sheets-Sheet 4
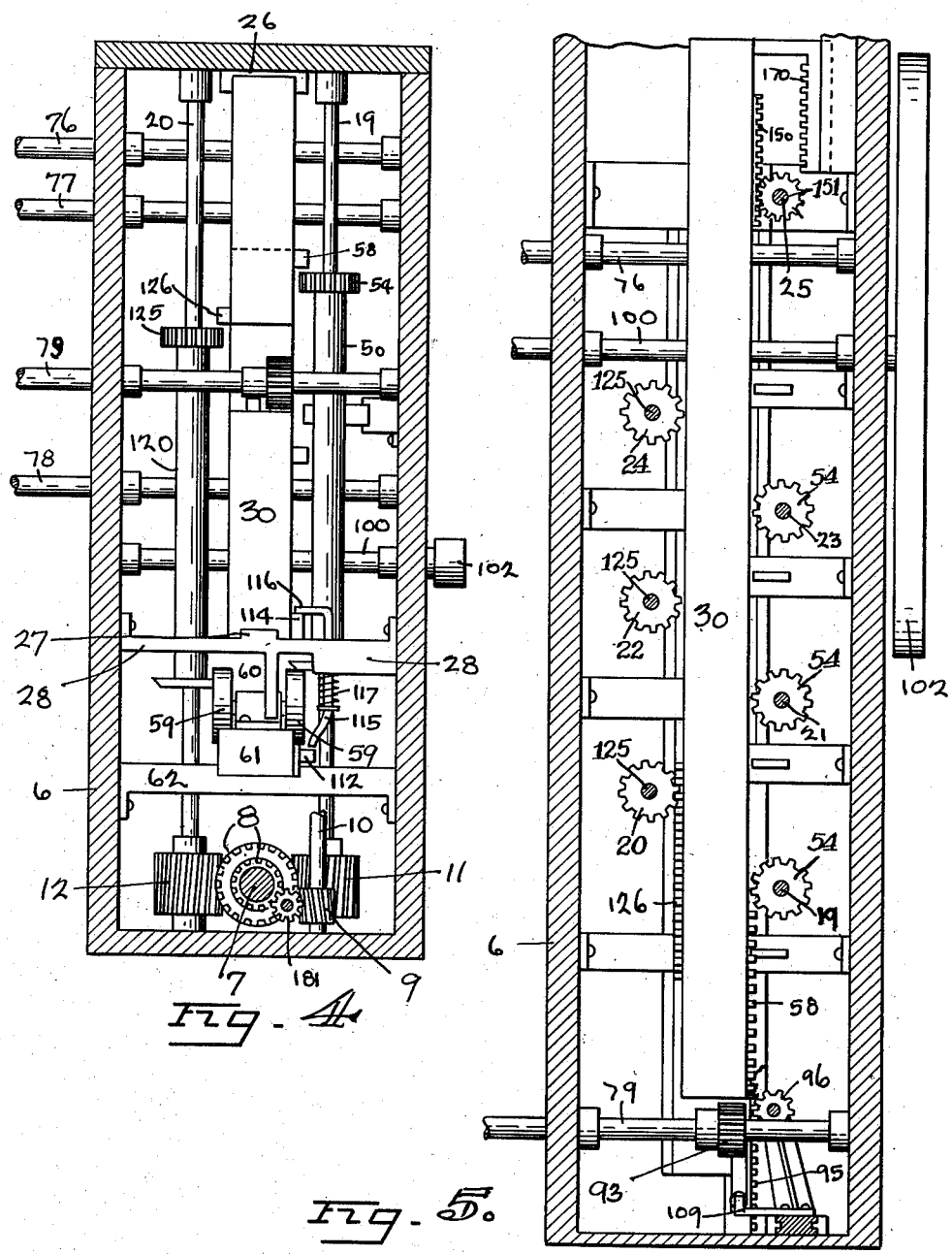
INVENTOR.
JOSEPH GRISENTI
BY
ATTORNEY

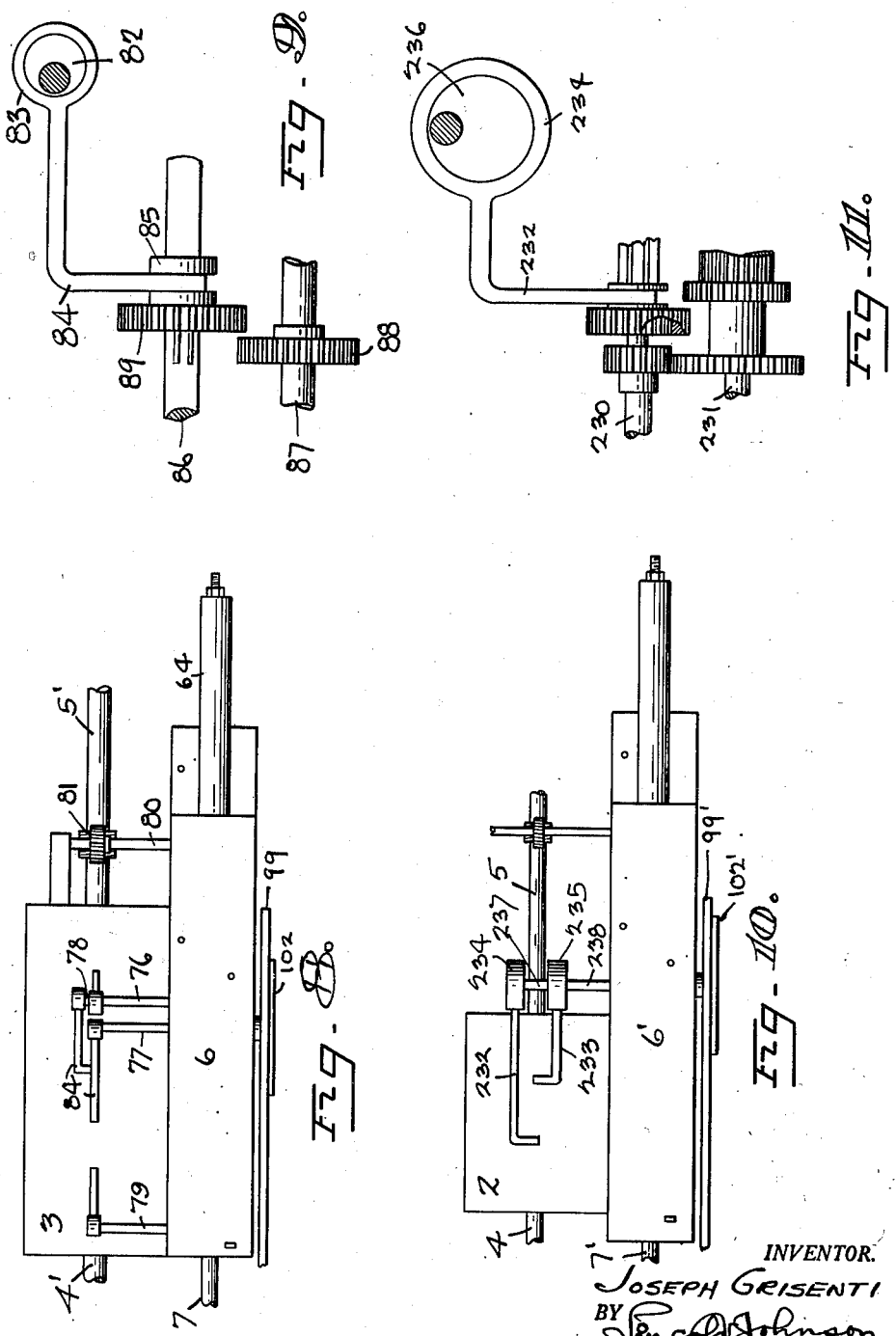

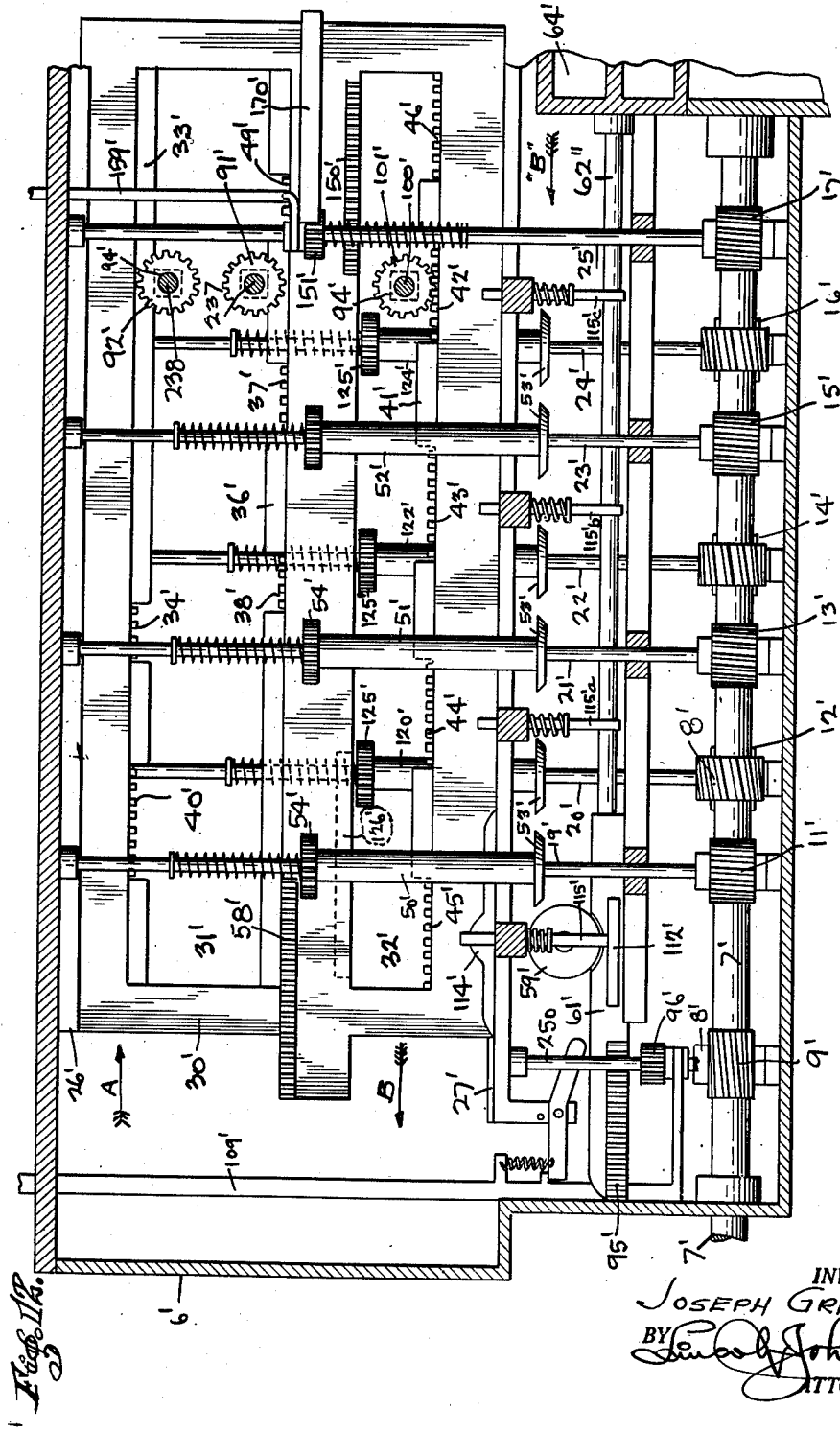

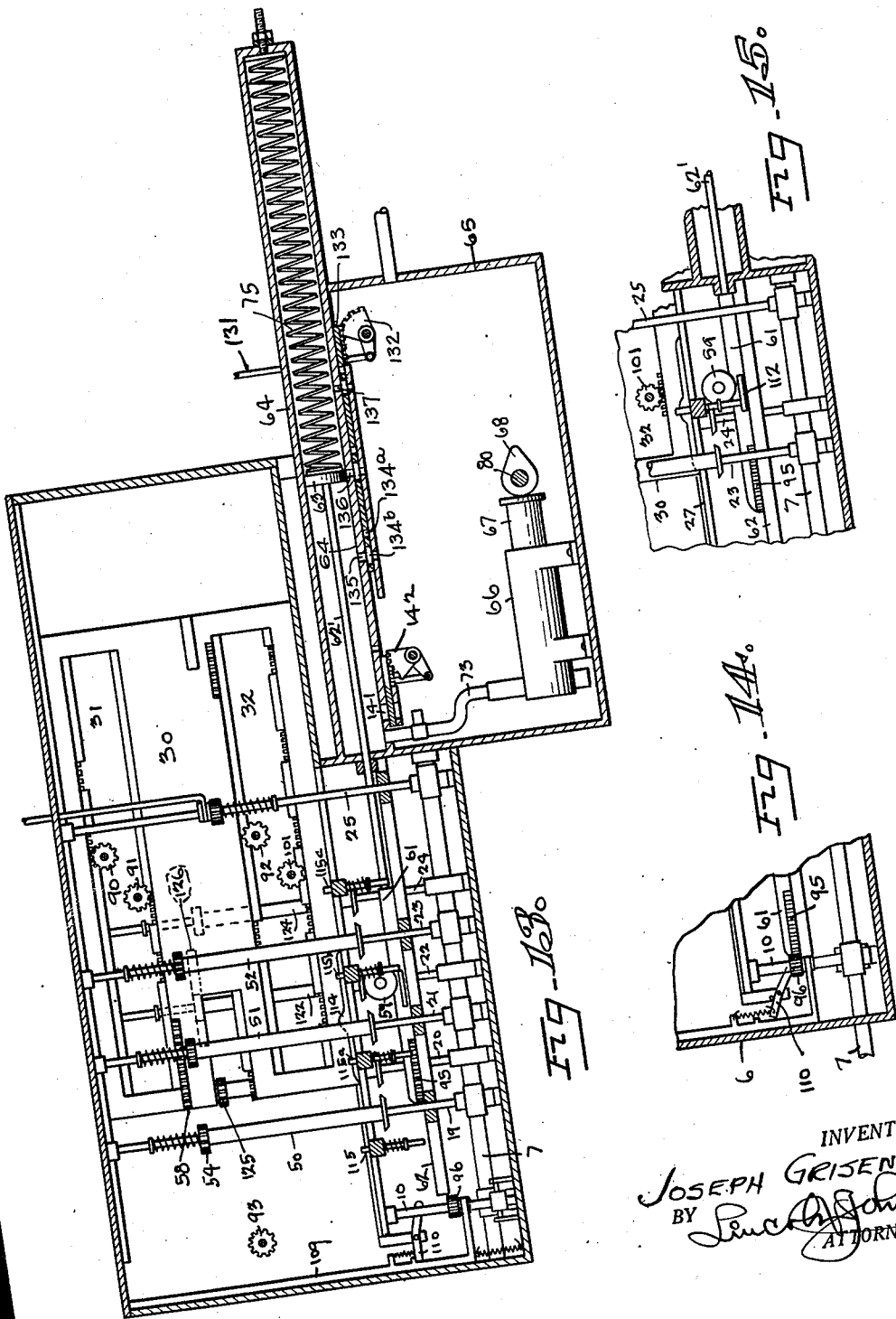

Jan. 5, 1937.　　　　J. GRISENTI　　　　2,066,527
GEAR SHIFTING APPARATUS
Filed Sept. 6, 1933　　　8 Sheets-Sheet 8

INVENTOR.
JOSEPH GRISENTI
BY
ATTORNEY

Patented Jan. 5, 1937

2,066,527

UNITED STATES PATENT OFFICE 2,066,527

GEAR SHIFTING APPARATUS

Joseph Grisenti, San Francisco, Calif., assignor to Angelina Grisenti, San Francisco, Calif.

Application September 6, 1933, Serial No. 688,313

45 Claims. (Cl. 74—336.5)

This invention relates particularly to an apparatus to be mounted on the gear box or transmission of an automotive vehicle, for the purpose of automatically shifting the gears in the transmission in accordance with the engine speed and speed of travel of the said vehicle.

An object of the invention is to provide a gear shifting mechanism for an automotive transmission wherein the gear shift is accomplished in a progressively forward or a progressively rearward direction, in direct ratio to the engine speed, the speed of travel of the vehicle, and the load carried by the said vehicle.

A further object of the invention is to provide an automatic gear shifting mechanism for an automobile, wherein the said transmission may be either of a standard and conventional type, or of a special type.

A still further object of the invention is to provide an apparatus for automatically shifting the gears of an automotive vehicle transmission to selected speeds after starting movement of said shifting mechanism has been initiated manually.

Other objects and advantages are to provide a gear shifting apparatus that will be superior in point of simplicity, inexpensiveness of construction, positiveness of operation, and facility and convenience in use and general efficiency.

In this specification and the annexed drawings, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

In the accompanying drawings:

Fig. 1 represents a side elevation of an automobile transmission having a gear shifting mechanism constructed in accordance with my invention, applied thereto.

Fig. 2 is an enlarged longitudinal cross-section taken through a portion of an automatic gear shifting apparatus to be mounted upon a non-standard type of gear box.

Fig. 3 is a longitudinal cross-section taken through the remainder of the automatic gear shifting mechanism shown in Fig. 2.

Fig. 4 is a cross-section taken through Fig. 2 on the line 4—4.

Fig. 5 is a plan section taken through Fig. 2 on the line 5—5.

Fig. 6 is a side elevation partly broken away, and in reduced scale, showing the power plunger for initiating the shifting of the gears.

Fig. 7 is an enlarged detail of one of the gear shifting elements, together with the locking cam thereon.

Fig. 8 is a plan view of a special type of transmission, having my gear shifting apparatus connected thereto and illustrating the method of connecting the operating parts of the shifting mechanism to the gear box.

Fig. 9 is a detail of a pair of gears in the gear box shown in Fig. 8, and illustrating an apparatus for shifting one of said gears.

Fig. 10 is a plan view of a standard form of transmission having my gear shifting mechanism applied thereto.

Fig. 11 is a detail of a plurality of gears of a standard transmission, having my shifting mechanism operatively connected thereto.

Fig. 12 is a longitudinal cross-section taken through a modified form of gear shifting mechanism designed to be mounted upon a standard type of gear box.

Fig. 13 is a vertical cross-section taken through the gear shifting mechanism, said mechanism being the same as that shown in Figs. 1, 2 and 3, and showing the apparatus at the moment of disengaging the low speed gear and engaging the intermediate speed gear.

Fig. 14 is a fragmentary detail which shows the stop lever 110 in position to prevent rearward movement of the slide block 61.

Fig. 15 is a fragmentary detail showing the slide 61 at the limit of its reciprocative movement, with the high speed gear in engagement.

Fig. 18 is an enlarged section taken thru one of the valve ports shown in Fig. 6, on the line 18—18.

Fig. 19 is a reduced size plane view of the handle for releasing the fluid pressure in the cylinder 64.

Figure 16:
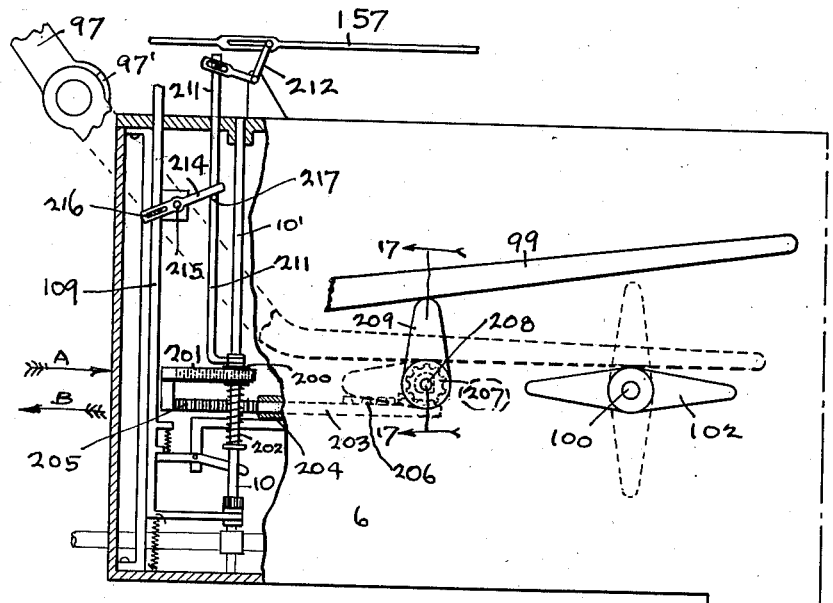
Fig. 16 is an enlarged side elevation, partly broken away to show the modified form of clutch engaging and disengaging mechanism.

In the conventional motor vehicle, forward or rearward movement of the vehicle is accomplished by disengaging the clutch between the engine and transmission, engaging any selected pair of gears, and then allowing the clutch to gradually engage, to move the vehicle in either a forward or rearward direction. With the standard and conventional type of gear shifting apparatus, it is necessary to coordinate the engine speed and vehicle speed, whereby the meshing of gears of proper ratio may be accomplished, without either injury to the gears themselves or to related parts of the mechanism. Even the best of drivers of motor vehicles oftentimes are unable to shift gears to avoid clashing of the gears or other damage to the operating parts. With my invention the starting of the vehicle in movement, in either a forward or a rearward direction, is initiated manually, after which movement of the said vehicle at higher speeds in a forward direction is automatically accomplished by my shifting mechanism.

In detail the construction illustrated in the drawings comprises a prime mover or engine 1, having a conventional form of clutch combined therewith and interposed between the engine 1 and the standard type of gear box 2, shown in Fig. 10, or a special type of gear box 3, shown in Fig. 8.

In the gear box 2, the drive shaft 4 connects to the engine clutch and the shaft 5 on the opposite side of the said gear box 2, connects to the wheel propelling mechanism of the vehicle. In a like manner, the shaft 4' on the gear box shown in Fig. 8, connects to the engine clutch, while the shaft 5' connects to the wheel driving mechanism. The gear shifting mechanism constituting the subject matter of this invention, is contained within a housing 6, mounted on one side of or adjacent to a gear box or transmission of either the conventional or special type, as shown in Figs. 8 and 10. Where the gear shifting mechanism is applied to the so-called standard gear box, as shown in Fig. 10, it is necessary to have a gear shifting mechanism of the type shown in Fig. 12, whereas, a gear shifting mechanism of the type shown in Figs. 2 and 3, will accomplish the shifting of gears in a special type gear box such as illustrated in Fig. 8. It is immaterial so far as my invention is concerned, whether the gear shifting mechanism is applied to either a standard or special type of transmission, inasmuch as the mode of operation in each instance is substantially the same. The gear shifting mechanism for a standard type of transmission is confined within the housing 6', shown in Fig. 12.

The apparatus and parts shown in Fig. 1 are identically the same, whether used in connection with the gear shifting mechanism for a special type of transmission as shown in Figs. 1 through 7 inclusive, or in connection with the standard type of transmission shown in Fig. 12, and hence it will be understood that a description of the operating mechanism shown in Fig. 1 will apply to gear shifting mechanism for either a standard or special type of transmission.

In the lower portion of the housing 6 shown in Fig. 2, I have provided a driven shaft 7 which is operatively connected to the engine 1 ahead of the clutch, and therefore rotates in unison with the crank shaft of the engine. The shaft 7 is provided with helical gears 8 arranged at spaced points throughout the length thereof, which gears are in meshing engagement with the helical gears 9, 11, 13, 15, and 17, located on one side of said shaft 7, and with gears 12, 14, and 16, located on the other side of said shaft 7.

The gear 9 is mounted on a shaft 10 which has its lower end journaled in the bottom of the housing 6, and its upper end journaled in a bearing 18, located within the housing 6. The gears 11 thru 17 inclusive are mounted on vertically disposed shafts 19 thru 25 inclusive, which shafts are located on opposite sides of the shaft 7, and said shafts have their opposite ends journaled in the top and bottom of the housing 6. The respective shafts 19, 21, 23, and 25, form a row on one side of the shaft 7 which lies in spaced parallel relation to the row of shafts 20, 22, and 24. Between the said parallel rows of shafts on the top of the casing, I have provided a guideway 26. A complementary guideway 27 is arranged adjacent the bottom of the casing 6, said guideway 27 being mounted on transverse supports 28 extending between the opposite sides of the casing 6.

A slide block 30 has its upper and lower edges slidably confined in the guideways 26 and 27, whereby said slide block may be moved in either a forward direction, indicated by the arrow A, or in a rearward direction, as indicated by the arrow B, to accomplish shifting of the gears in the gear box 3, as will be hereinafter explained. The slide block 30 is provided with a pair of longitudinally disposed slots 31 and 32. The under edge 33 of the upper slot 31 being formed as a cam locking member and having cuts therein at spaced points, forming the gear racks or toothed portions 34 and 35 respectively. The rack 34 causes engagement of the low speed gear in the gear box on forward movement in the direction A of the slide block 30, and disengagement of the same gear in the gear box on movement of the slide block in the opposite direction. The space between the gear racks 34 and 35 serves to hold the gear in the gear box 3 in engagement until forward movement of the slide block 30 allows the rack 35 to cause the said gear in the gear box 3 to be disengaged when moved in the direction A, or engaged when moved in the reverse direction B.

The lower edge of the slot 31 is provided with a cam locking guide 36 thereon, and the same has toothed portions or gear racks 37 and 38 cut therein. The gear rack 37 is designed to cause the engagement of the second speed gear in the transmission when moved in the direction of the arrow A, and to cause the disengagement of said gear when moved in the direction B. Similarly, the gear rack 38 causes the disengagement of the second speed gear when moved in the direction of the arrow A, and the engagement thereof when moved in the direction of the arrow B.

The upper edge of the lower slot 32 is provided with a cam guide 39 thereon, a portion of which is interrupted at 40 with a gear rack for engaging the high speed gear of the transmission when the slide block 30 is moved in the direction of the arrow A, and for disengaging said high speed gear when moved in the direction of the arrow B. The lower edge of the slot 32 is provided with a cam guide 41 thereon, said cam guide being interrupted at intervals by gear racks 42, 43, 44, and 45 respectively. Each of the gear racks 42, 43, 44, and 45 are adapted to cause the engagement and disengagement of the clutch at proper intervals in relation to the shifting of the low, intermediate, and high speed gears. A gear rack 46 is also provided along the edge 41 to operate the clutch when engaging the reverse speed gears of the transmission. A slot 47 is provided at one end of the slide block 30, said slot having a cam guide 48 along an edge thereof, together with a gear rack 49 for engaging the reverse speed gearing of the transmission when the slide block 30 is moved in the direction of the arrow B, and for disengaging said reverse gearing when the slide block is moved in the opposite direction.

Three of the vertically disposed shafts 19, 21, and 23, on one side of the slide block 30, are provided with sleeves 50, 51, and 52, slidably splined thereon, the lower end of each sleeve having a lifting plate 53 thereon, and the upper end of each sleeve having a gear 54 thereon. A stop collar 55 is provided around each of the shafts 19, 21, and 23, to limit the downward movement of the respective sleeves 50, 51, and 52. An expansion spring 56 is confined around the upper end of each of the said shafts between the sleeve on each shaft and a stop collar 57 attached to each of said shafts. A gear rack 58 is provided on one side of the slide block 30 facing the gears 54 on the sleeves, said gears 54 assuming a normal position out of engagement with the rack 58.

A gear rack 126 is provided on the opposite side of the slide block 30 facing the gears 125 on the sleeves 120, 122, and 124, arranged on the respective shafts 20, 22, and 24. The gears 125 on the sleeves 120, 122, and 124, rotate in a direction which will cause the slide block 30 to be moved forwardly in the direction of the arrow A, while the gears 54 on the respective sleeves 50, 51 and 52, rotate to engage the rack 58 on the slide block, to move said slide block in the opposite direction, or that of the arrow B. The sleeve 50, altho raised and lowered ahead of the sleeve 120 on the initial movement of the slide block, plays no part in imparting forward directional movement to the slide block.

The second sleeve 120 is adapted to be elevated on the shaft 20 to engage the gear 125 thereon with the rack 126, to cause the slide block 30 to move progressively forward and to be successively engaged by the gears 125 on the sleeves 122 and 124, to effect successive shifts of the gears in the transmission through the low, intermediate, and high speeds.

The sleeves 50, 120, 51, 122, 52, and 124, are raised by means of a roller cam 59 journaled in a bearing 60 on a slide member 61. The slide 61 is guided in a transversely disposed guide frame 62 mounted adjacent the bottom of the casing 6, said slide 61 being arranged in vertical alignment with the slide block 30, and is equi-distantly confined within the parallel rows of shafts 19 thru 25 inclusive. One end of the slide 61 is provided with a shaft 62' thereon, which engages with a plunger 63 operatively mounted in a cylinder 64. The cylinder 64 is operatively related to a casing 65 acting as a sump or reservoir for oil or other fluid to be used for creating a pressure against the plunger 63 in the cylinder 64.

A reciprocating pump 66 is mounted within the reservoir 65, the plunger 67 of said pump being operated by a cam 68, which in turn is directly connected to the wheel drive shaft thru a shaft 80 and meshing gears 81 on the shaft 80 and shaft 5' respectively. The cylinder of the pump 66 is provided with an inlet port 69 having a check valve 70 mounted therein, and an outlet port 71 provided with a check valve 72 therein. The outlet port 71 is connected by a pipe 73 to the cylinder 64, to supply fluid under pressure thereto. A pressure relief valve 74 is provided in the pipe 73. The fluid which is placed under pressure by the pump 66, is directed into the cylinder 64 causing the plunger 63 to move axially therein and to compress the expansion spring 75. Movement of the plunger 63 causes corresponding movement of the slide 61, and causes cam roller 59 on said slide to successively engage the lifts 53 on the sleeves 50, 120, 51, 122, 52, and 124.

The transmission box 3 is provided with a plurality of gear shifting shafts journaled thereon, there being a shift shaft 76 for the low speed gear; a shift shaft 77 for the intermediate speed gear; a shift shaft 78 for the high speed gear; and a shift shaft 79 for the reverse speed gear. Each shift shaft, as shown in Fig. 9, is provided with an eccentric 82 thereon, around which an eccentric strap 83 is mounted, said strap 83 having an arm 84 extended therefrom in the form of a shifting fork, to engage a collar 85 on the gear in the transmission which it is desired to shift.

The driving and driven shafts in the transmission are indicated by the numerals 86 and 87, one transmission gear 88 being fixed to the shaft 87, while the other gear 89 is slidably splined on the shaft 86.

The low speed shift shaft 76 projects thru the casing 6 into the slot 31 on the slide block 30, and a pinion 90 is mounted on the end of said shaft to engage the respective gear racks 34 and 35. The second speed shift shaft 77 likewise extends into the casing 6 and into the slot 31 in the slide block 30, the end of said shaft 77, within the casing, having a pinion 91 thereon to engage the respective gear racks 37 and 38. The high speed shift shaft 78 likewise extends into the casing 6 and into the slot 32 in the slide block 30, there being a pinion 92 on the end of said shaft 78 to engage the gear rack 40 on said slide block. The reverse gear shift shaft 79 extends into the casing 6, and a gear 93 on the end of said shaft, within the casing 6, is adapted to engage the gear rack 49. Each of the gears 90, 91, 92, and 93 is adapted to be rotated a one-half turn by the racks engageable therewith, to thereby engage or disengage corresponding gears in the transmission. In order to prevent each of the said gears 90, 91, 92, and 93 from turning more than the requisite one-half turn, I have provided a cam 94 on the face of each pinion, which cam engages one of the cam guides 33, 36, 39, or 41, to prevent engagement or disengagement of a selected gear in the transmission other than by forward or rearward movement of the slide block 30, as shown in Fig. 7.

A gear rack 95 is provided on one face of the slide 61, said rack 95 being adapted to be engaged by a gear 96 slidably splined on the vertically disposed shaft 10.

In order to move an automotive ve..cle having an automatic gear shifting apparatus constructed in accordance with my invention mounted thereon, in a forward direction, the operator first presses the pedal 104 to lift the bar 109 and engage the gear 96 with the rack 95.

Initial actuation of the pedal 104 causes (thru the link 105, bell crank 106, link 107, and bell crank 108) the bar 109 in one end of the casing 6 to be elevated and to mesh the gear 96 on the shaft 10 with the rack 95 on the slide 61. The gear 96 is driven at engine speed by the shaft 7, and immediately upon engagement with the rack 95, causes the slide 61 to move forwardly in the direction of the arrow A, until the cam 59 on said slide passes under the sleeve lift 53, first raising and then lowering the sleeve 50, after which the cam 59 enters under the sleeve lift 53 and lifts the sleeve 120, and gear 125 into engagement with the gear rack 126. The gear 125 is driven at constant speed by the shafts 20 and 7, and causes initial forward movement of the slide block 30. The initial movement of the slide block 30 immediately causes the rack 42 to rotate the clutch operating gear 101 a one-quarter turn. On the regular and conventional clutch operating shaft 98 I have journaled a clutch lever extension 99 which is arranged along the outside of the casing 6. The clutch pedal 97 is provided with a shoulder 97' thereon which abuts against the lever extension 99, whereby swinging movement of the lever 99 thru the shoulder 97' will cause movement of the clutch pedal 97 and engagement and disengagement of the clutch. The clutch pedal 97 may be actuated independently of the lever 99.

A shaft 100 is journaled in one side of the casing 6, the inner end of said shaft having a pinion 101 thereon, confined within the slot 32 in the slide block 30, said pinion 101 being engageable respectively with the gear racks 42 thru 46 inclusive, said gear racks, when engaged with the pinion 101, being adapted to rotate said pinion throughout a one-quarter turn for engaging and disengaging the engine clutch.

The outer end of the shaft 100 is provided with a double ended cam 102 engaging the under side of the clutch lever extension 99. A tension spring 103 engages the extreme end of the clutch lever extension 99 to hold it in contact with the double ended cam 102.

When the slide 61 has reached the limit of its initial forward movement by the act of the gear 96 becoming disengaged from the rack 95, one end of the pivoted lever 110 drops behind the extreme end of the slide 61, as in Fig. 14, and prevents the slide 61 from returning to the normal inoperative position shown in Fig. 2. When the gear 96 and rack 95 have functioned to cause the initial movement of the slide 61, to a point where forward movement of the slide block 30 is furnished by the gears 125 and rack 126, the tension spring 111 may pull the bar 109 downwardly, to disengage the gear 96 from the rack 95 and to restore the pedal 104 to its normal position, provided the foot pressure on the pedal 104 is released.

The side of the slide 61 is provided with a shoulder 112 thereon, which shoulder is adapted to function in relation to a cam 113 on the side of the slide block 30, said cam 113 having a projection 114 thereon extending above the plane of the remainder of the cam.

In the transverse supports 28 for the guide 27, I have mounted a plurality of stop pins 115, located in predetermined relation to the shafts 19 thru 24 inclusive. Each stop pin 115 is provided with a lateral extension 116 on its upper end, which at times is adapted to ride on the cam 113 and projection 114. An expansion spring 117 on each stop pin acts to urge the stop pin 115 downwardly to either rest on or in the path of travel of the projecting shoulder 112, until the raised portion 114 of the cam raises the stop pin 115 sufficiently to permit the shoulder 112 on the slide 61 to clear.

The sleeves 50, 51 and 52, as shown in Fig. 2, on the front side of the slide block 30, have the gears 54 thereon engageable with the gear rack 55, only when the slide block 30 is moved in a rearward direction, or in a direction toward the left, as indicated by the arrow B. The gears 54 will only engage with the rack on movement in the rearward direction B because the gears 54 are quickly raised and lowered by the slide 61 an interval of time before the rack commences its forward movement. Thus, when the slide block 30 is moved in a forward direction, or in a direction toward the right, as indicated by arrow A, the gears 54 on the sleeves 50, 51, 52, do not assist in imparting any forward movement to the slide block. The shafts 20, 22, and 24 on the rear side of the slide block 30, have the respective tubes 120, 122, and 124, drivingly mounted thereon, and each of said last mentioned tubes has a gear 125 thereon to engage a gear rack 126 on the rear side of the slide block 30. The engagement of the gears 125 with the rack 126, causes the slide block 30 to be moved in a forward or right hand direction, as indicated by the arrow A, but perform no function when the slide block is moved in the opposite direction.

In the first position, shown in Fig. 2, the stop pin 115 rests on the shoulder 112, whereby the cam roller 59 is free to move under the lift 53 and raise the sleeve 120 and gear 125 up to a point of engagement with the rack 126 on the slide block 30. As the slide block 30 commences its initial movement, the clutch pinion 101 is turned by the rack 42 thru a quarter turn, until the double ended cam 102 assumes the position shown in dotted lines in Fig. 1, disengaging the clutch. Thus, the first or initial movement of the slide block 30 causes the engine clutch to be disengaged, and immediately following, the gear rack 34 is brought into registry with the pinion 90, thereby rotating said pinion a half turn, and causing the shift shaft 76 to be operated to bring the low speed gear of the transmission 3 into mesh with its corresponding gear, and the clutch is re-engaged by the rack 43 moving the clutch pinion 101. At this point the stop pin 115 drops down behind the end of the shoulder 112 on the slide 61, thereby preventing the slide 61 from returning to its starting position.

With each change of speed my apparatus operates according to the same formula, and hence this should be remembered as the description progresses, to wit;—the slide block 30 first moves to disengage the clutch, next one or more selected gears are disengaged and engaged one after the other and finally the clutch is re-engaged. The stop pins 115 prevent movement of the control slide 61 while the clutch is being actuated and the selected gears engaged or disengaged.

The clutch pinion 101 is always meshed with one of the racks 42, 43, 44, and 45 when the clutch is engaged, whereby a quarter turn of the pinion 101 in either direction will disengage the clutch. The adjacent cam guide 41 holds the pinion non-rotatable until the succeeding rack turns the pinion a quarter turn to allow the clutch to re-engage. The clutch pinion always comes to rest midway between the ends of the respective racks.

The slide 61 moves in advance of the slide block 30 and the cam 114 on the slide block raises the stop pin 115a to permit the shoulder 112 on the slide 61 to pass therebelow after the gears have been shifted and the clutch engaged.

The fluid pressure to be developed by the pump 66 depends entirely on the speed of rotation of the vehicle propelling shafts, and as the vehicle speed increases, fluid pressure is developed in proportion, so that the fluid pressure directed against the plunger 63 thereafter causes the slide 61 to be moved forwardly, in the direction of the arrow A, on the guide 62. In the event the vehicle speed is sufficient to develop necessary pressure in the cylinder 64, the slide 61 is pulled forward an additional step to a point where the shoulder 112 on the slide will strike the stop pin 115b, and thereby temporarily stop further forward movement of the slide 61. When the slide moves from the stop pin 115a to the stop pin 115b, the roller 59 on the slide raises and lowers the sleeve 51 and thereafter raises the sleeve 122 with the gear 125 thereon, to a point where the said gear 125 on the sleeve 122 will engage the rack 126 and continue the forward movement of the slide block.

In the second step of movement of the slide block 30, effected by the engagement of the gear 125 on the sleeve 120 with the rack 126, said rack is moved forwardly with the slide block to a point where said rack 126 may be engaged by the gear 125 on the sleeve 122. When the sleeve 122 and the gear 125 thereon, commence to move the slide block 30 in a forward direction, several actions result; first, the clutch is disengaged and momentarily held in a disengaged position, and almost immediately the low speed gear is disengaged and the intermediate speed gear is engaged, and then the clutch is re-engaged, which action is indicated on Fig. 2 of the drawings by the title "intermediate clutch". The last mentioned second phase of automatic movement of the slide block 30, rotates the clutch pinion 101 to disengage the clutch from the low speed clutching position, and the rack 43 causes said clutch pinion 101 to rotate to engage the clutch on the intermediate speed clutching position. During this phase of movement, the gear rack 35 on the low speed shift, causes the disengagement of the low speed gear in the transmission by properly turning the pinion 90, and almost immediately the gear segment 37 on the intermediate speed shifting mechanism, engages the pinion 91, to thereby rotate said pinion a one-half turn, and engage the intermediate or second speed gears in the engine transmission. During this phase of movement, the cam 114 on the slide block has also raised the stop pin 115b to a point where the shoulder on the slide 112 is free to advance another step in the forward direction. If the vehicle speed is sufficient to generate enough pressure in the cylinder 64, the slide 61 is advanced another step in the forward direction until the stop 112 on the said slide 61 abuts against the stop pin 115c. When the slide 61 passes from beneath the stop pin 115b to the stop pin 115c, the roller 59 causes the sleeve 52 to raise and lower, and said roller also raises the sleeve 124 to a point where the gear 125 on said sleeve, will engage the rack 126 and advance it still another step in the forward direction. As the slide block is caused to move in this last mentioned step, the clutch pinion 101 is moved by the gear rack 44 to disengage the clutch, the gear rack 38 on the intermediate speed shifting mechanism rotates the pinion 91 to shift the intermediate gear out of mesh in unison with the gear segment 40 engaging the pinion 92 to effect the engagement of the high speed gears in the transmission, after which the clutch is brought into engaging position by the gear rack 45. The action of bringing the slide block 30 to a point where the high speed gear in the transmission 3 is engaged, also has brought the cam 114 into position to lift the stop pin 115c to clear the shoulder 112 on the slide 61, and to permit said slide to continue its forward movement until the end of the slide block abuts the end of the housing, as shown in Fig. 15. At this point, the stop pin 115c rests upon the upper face of the shoulder 112, and the slide 61 is in position to move in the reverse direction, or that of the arrow B, in readiness to engage either the intermediate or low speed gears in the event the speed of the vehicle could not be maintained in high. As long as the slide 61 remains in the position shown in Fig. 15, the vehicle will be maintained in high or direct drive.

The slide block 61 is advanced in the forward direction by the fluid pressure generated by the pump 66 in accordance with the speed of the vehicle. It will be noted that the cam 68 which actuates the pump 66, is driven by a shaft drivingly connected to the propeller shaft of the vehicle as shown in Fig. 8. The speed of rotation of the propeller shaft causes the pump to develop pressure in direct proportion to the vehicle speed. Relatively low pressure is developed where the speed of the vehicle is low, and as the speed of the wheels increases, the fluid pressure is likewise increased.

Heretofore the action of moving the slide block 61 with the roller 59 thereon, with relation to the gear shifting members in the forward direction, has been traced without describing the intimate functions played by the plunger 63 in such operation. As heretofore described, initial movement of the vehicle is commenced by depressing the foot pedal 104, which manually causes connections to be made to effect the first or initial step of movement of the slide 61, in which operation the bar 109 is raised to engage the gear 96 and rack 95, by means of which the slide 61 is moved in a forward direction, to a point indicated in Fig. 14. The link 107 which actuates the bell crank 108 to lift the bar 109, is also connected at its end to a bell crank 130, which in turn is connected by a link 131 to a gear segment 132 in the reservoir 65. The gear segment 132 meshes with a rack 133 on a ported slide valve 134, having a plurality of equally spaced ports 134a and 134b arranged in operative relation to longitudinally disposed ports 135, 136, and 137, communicating with the cylinder 64. The action of depressing the foot pedal 104 simultaneously raises the bar 109 and link 131, to cause movement of the slide valve 133 to register the valve ports 134b with the ports 135, 136, and 137 in the cylinder 64. By opening said ports at the start of operation, it results that when the vehicle starts to move and the pump 66 starts to work, low pressure will be gradually accumulated in the cylinder 64 to work against the piston 63. As this pressure develops in accordance with the speed of movement of the vehicle, the piston 63 is caused to move against the compression spring 75 and to thereby advance the slide block 61 and roller 59 through the shifting of the gears, in a forward direction, as heretofore described. The ports 134b are larger than the ports 134a so that the pressure discharge from the cylinder may be carried on throughout a substantial interval of time for better control of the operation of the apparatus.

In Fig. 3, the piston 63 is shown in the normal or starting position, and after sufficient pressure is developed to cause movement of the piston into the dotted position shown at X, in Fig. 3, which movement causes the engagement of the low speed gears in the transmission, the piston remains at position X until the wheel speed is increased to a point where additional pressure can be built up in the cylinder 64. Additional movement of the piston 63 in the forward direction, can only be obtained by the speed of the vehicle increasing to a point where the pump will develop pressure sufficient both to move the piston 63 and to take care of the additional pressure which is by-passed thru the port 135 as the piston 63 uncovers said port in its forward movement.

The diameter of the by-pass ports 135, 136, and 137 is calculated and designed with respect to the pressure developed by the pump 66 and so that movement of the piston in the forward direction can be obtained without entirely dissipating all of the pressure developed by the pump. As the vehicle speed increases, and additional pressure is built up in the cylinder 64, the piston 63 moves from the position X to the position Y, and movement of the piston from station X to station Y effects the change of speeds from the low speed to the intermediate speed. The piston 63 remains at the station Y for a sufficient period to allow the vehicle to adjust itself to the intermediate speed. As the speed of the vehicle increases sufficient to warrant the shift from the intermediate speed to the high speed, pressure is built up in the cylinder 64 to cause the movement of the piston 63 from the station Y to the station Z, during which movement of the piston 63, the transmission gears are shifted from the intermediate speed to the high speed. When the piston 63 is at the station Z, the vehicle runs in high gear and as the pressure of the pump develops its maximum pressure, the piston 63 is moved to the end of its stroke, at which time it uncovers the by-pass ports 139 in the cylinder 64, thru which ports the fluid under pressure, is returned to the reservoir 65. The pump 66, when operating at maximum capacity, develops sufficient pressure in the cylinder 64 to force the piston 63 to the limit of its forward stroke, and to maintain said piston in said position while by-passing the excess pressure thru the ports 135, 136, 137, and 139. When the pump is developing approximately two-thirds of its capacity pressure, the piston 63 is moved to shift the intermediate speed gear while by-passing a lesser amount of pressure. Similarly, when the pump is developing approximately one-third of its capacity pressure, it is capable of moving the piston to shift the low speed gear and at the same time by-pass a portion of the pressure.

The cylinder 64 is provided with valve closed ports 190 and 191 in diametrical alignment with the respective ports 135 and 136. Each valve port 190 and 191 is provided with a disc valve 192 slidably confined therein, together with a spring 193 to hold the valve open against a selected fluid pressure. When the vehicle starts to move between zero and ten miles per hour, relatively low fluid pressure ranging from zero to three pounds per square inch is developed in the cylinder 64, to work against the piston 63 and to overcome the reactance of the compression spring 75. As the vehicle speed approaches approximately 10 miles per hour and pressure of approximately three pounds per square inch is developed, the piston 63 is moved from the full line position in Fig. 3 to the dotted position indicated at station X. At this point the ports 135 and 190 would be blocked off and the pressure would be built up relatively fast. When the piston moves to the station X, the vehicle is shifted into low speed ahead. The piston 63 stays at station X until the pressure builds up to a point where the piston can be moved toward station Y. When the vehicle speed exceeds approximately 10 miles per hour and pressure better than three pounds per square inch is developed, then the piston starts to move away from station X, uncovering the ports 135 and 190 and by-passing the pressure not required to move the piston. As the speed of the vehicle increases and the pressure increases above three pounds per square inch, then the expansion of the valve spring 193 is overcome at approximately four pounds per square inch, and the valve 192 in the port 190 is closed. This immediately causes a fast build up of pressure and moves the piston 63 to the station Y where the ports 136 and 191 are blocked off, which movement also accomplishes a shift of gears from low to intermediate speed. The piston 63 stays at station Y until the vehicle speed approaches 20 miles per hour, and the pressure builds up to approximately seven pounds per square inch, when the piston may be moved toward station Z. When the vehicle speed exceeds 20 miles per hour and the pressure better than 7 lbs. per square inch, then the piston starts to move away from station Y, uncovering the ports 136 and 191 and by-passing the pressure not required to move the piston. As the speed of the vehicle increases above 20 miles per hour, and the pressure increases above 7 lbs. per sq. inch, then the expansion of the spring 193 in the port 191 is overcome at approximately 8 lbs. per square inch, and the valve 192 in the port 191 is closed. The closing of the valves 192 in the ports 190 and 191 does not affect the ports 135 and 136. When the speed of the vehicle actuates the shifting devices 61 and 30, respectively, the ports 134a and 134b are always open to communication with the cylinder ports 135, 136, and 137 and a portion of the pump pressure, not required to move the piston 63, is by-passed thru said cylinder ports.

If it should be desired to keep the vehicle travelling in high gear but at a relatively low speed, such as 10 or 15 miles per hour, the valve 134 would be moved to block off the ports 135, 136, and 137 to thereby direct the entire output of the pump 66 against the piston 63 without by-passing any thereof thru the ports 135, 136, and 137. If it should be desired to travel the vehicle in either intermediate or low speeds, the pressure relief valve 140 would be manipulated by the hand control 146, as shown in Fig. 19, to by-pass pump pressure in sufficient quantity to keep the slide 61 in coordinating position with the slide block for effecting the desired intermediate or low speed.

In order to shift the gears downwardly from the high speed to either the intermediate, or the low speeds, or the neutral position, it is accomplished automatically by the speed of rotation of the propeller shaft actuated by the traction wheels. As the speed of the propeller shaft slows up, the pump 66 is caused to develop less pressure, whereby the compressed expansion spring 75 causes the piston 63 to be moved in the rearward direction, that of the arrow B, from the station Z to the station Y. During this phase of movement of the piston, the slide block 61 causes the sleeve 52 with the gear 54 thereon, to be raised and to engage the rack 58 and start the slide block 30 in the direction of the arrow B. As the slide block 30 commences its rearward movement, the clutch rack 45 reacts with the clutch pinion 101 to disengage the clutch, and in timed relation the rack 40 reacts with the high speed pinion 92 to disengage the high speed gear, and simultaneously and in following sequence, the rack 38 engages the intermediate speed pinion 91 to mesh with the intermediate speed gear. In dropping down from high gear to intermediate gear, the shoulder 112 on the slide 61 passes from beneath the stop pin 115c and abuts against the stop pin 115b, at which point the slide 61 remains until the slide block 30 reaches a point where the cam 114 on said slide block, acts to raise the stop pin 115b, to permit the slide 61 to return another stroke in the rearward direction. If the propeller shaft speed should become relatively slow, then likewise the pressure developed by the pump would decrease, and the expansion spring 75 would urge the piston 63 and slide 61 rearwardly to a point where the slide 61 would abut against the stop pin 115a. As a result, the roller 59 on said slide would lift the sleeve 51, together with the gear 54 thereon, into engagement with the rack 58, and cause the continuance of movement of the slide block 30 in the rearward direction. This step in the return movement of the slide block, causes the engine clutch to be declutched, the intermediate speed gear to be disengaged, and the low speed gear engaged and the clutch re-engaged. The final movement of the slide block in this step of operation, elevates the stop pin 115a so that the slide 61 may return to a point approximating the starting position. If the speed of rotation of the vehicle should approach the minimum, so that the pump pressure would be correspondingly low, then the last mentioned movement of the slide 61 would cause the raising of the sleeve 50, together with the gear 54 thereon, to engage the rack 58, and return said slide block to approximately the starting or neutral position, at which point the slide block 30 might be again moved in a forward direction.

If it should be desired to move the vehicle in a reverse direction, the vehicle would have to be brought to a standstill or stop before the block 30 could be moved in a reverse direction (arrow B). As the slide block 30 is moved by the gear on the sleeve 50 to the starting position, the clutch is disengaged to permit the disengagement of the low speed gear. The operation of returning the piston 63 from the high speed position to that of the starting position, has been described with particular reference to a gradual drop in the speed of the vehicle.

The operation of the gear shift mechanism is automatic and at the same time is under direct control of the operator by means of the hand control 146 on the relief valve 140 and the relief port 141 in the cylinder 64. The valve 140 is provided with a gear rack on an end thereof, meshing with a gear segment 142 swingingly mounted within the reservoir 65. The segment 142 is moved by a link 143, bell crank 144, link 145, and control lever 146, indicated in Fig. 1 on the vehicle steering wheel column.

When the hand lever 146 is manipulated to open the valve 140, the entire fluid pressure is immediately by-passed, and the expansion spring 75 pushes the piston 63 in a rearward direction, and automatically disengages the high, intermediate, and low speed gears in succession.

In order to move the vehicle in a reverse direction by engagement of the reverse gears in the transmission 3, I have provided a gear rack 150 on one face of the slide block 30, and on the vertically disposed shaft 25 I have slidably splined a gear 151. The gear 151 is maintained out of engagement with the rack 150 by an expansion spring 152. Reverse movement of the slide block 30 is accomplished by depressing the foot pedal 153, which is fulcrumed on the vehicle frame at 154. A link 155 is pivotally connected at one end thereof to the pedal 153, and at its opposite end, said link 155 is pivotally connected to a bell crank 156. The other arm of the bell crank is connected by a link 157 to a bell crank 158. The other arm of said bell crank is connected by a shift bar 159 to a collar 160 on the gear 151. When the reversing pedal 153 is depressed, the gear 151 is moved downwardly by the shift bar 159 into engagement with the rack 150. The gear 151 being constantly running, causes the slide block 30 to move rearwardly in the direction of the arrow B, first causing the engine clutch to be declutched, and immediately thereafter engaging the reverse shift rack 49 with the reversing pinion 93 to engage the reversing gears in the transmission 3. After the reversing gears have been engaged, the clutch is engaged and the reverse clutch rack 46 holds the engine clutch in the engaged position, while the cam rack 48 on the reverse shaft holds the cam on the reversing pinion 93 in the engaged position.

When the slide block 30 starts in reversing movement, it immediately engages a lever 195 in the casing 6, said lever being connected by a rod 196 to a bell crank 161, which in turn is pivotally connected to the rod 143 on the relief valve 140. Thereafter at the moment the slide block 30 starts its rearward movement, the fluid pressure behind the piston 63 is released so that the slide block 61 may move into the starting position, or position of rest shown in Fig. 2.

The reverse gear in the transmission 3 is disengaged by removing the foot from the reversing pedal 153, allowing the expansion spring 152 to disengage the gear 151 from the rack 150, and to be lifted upwardly into engagement with a rack 170 spaced outwardly from the plane of the face of the slide block 30. As soon as the gear 151 engages the rack 170, the slide block 30 is moved in the direction of the arrow A, causing the clutch to disengage, and immediately following, causing the reverse gears to disengage and the slide block 30 to assume the neutral position shown in Fig. 2.

As shown in Fig. 1, a conventional type of foot throttle 171 is provided, said throttle being connected to the carburetor on the engine 1. A sliding and pivoted link connection 172 is interposed between the throttle 171 and the clutch lever extension 99, whereby the foot throttle is rendered inoperative whenever the engine clutch is disengaged by the lever 99. It is well known that the gears in an automotive transmission cannot be shifted where the engine speed is greatly in excess of that of the speed of rotation of the propeller shaft, so that in conventional practice, the engine is not speeded up at the instant the transmission gears are being shifted. In my structure, the hook-up between the engine throttle and clutch shaft, prevents the throttle from being operated therewith, and at such times as the gears are being shifted.

In Fig. 1, I have also shown an intake manifold of the engine designated by the numeral 173, connected by a pipe 174 to a suction chamber 175, within which the piston or diaphragm 176 is movably mounted. The suction piston 176 is connected by a rod 177 to the rod 107, thereby to use the suction power of the engine for moving the slide valve 133.

A dash pot 178 having a piston 179 therein, connected by a link 180 to the clutch lever extension 99, is provided to assist in retarding the downward action of the lever 99 at such times as the engine clutch is being moved from the disengaged to the engaged positions.

The helical gear 8 on the shaft 7 which rotates the shaft 10, is of smaller diameter than the remaining helical gears 8 on the shaft 7, and a reversing gear 181 is interposed between the smaller diametered helical gear 8 and the helical gear 9 on the shaft 10, in order to reverse the rotation of the gear 96 to drive the slide 81 in a forward direction upon initiating movement of the gear shifting mechanism.

In Fig. 13 I have shown the automatic shifting apparatus with the slide block and the roller 59 thereon, in engagement with the sleeve 122 during that phase of operation when the gears of the transmission would be shifted into the intermediate speed.

Figure 17:
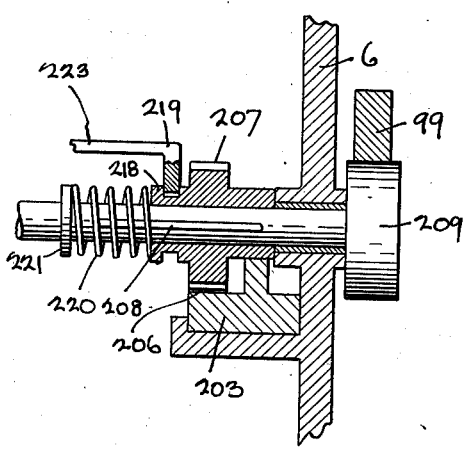
Fig. 17 is an enlarged cross-section taken through Fig. 16 on the line 17—17.

In Fig. 16 I have shown a clutch engaging and disengaging mechanism which operates independently of the engagement or disengagement of the clutch by the double ended cam 102. The apparatus shown in Fig. 16, provides that the clutch on the engine shall assume a disengaged position whenever the vehicle is at a standstill. In the conventional automobile the clutch remains engaged when the vehicle is at a standstill, whereas with my construction, as shown in Fig. 16, the clutch is always to be maintained in a disengaged position whenever the vehicle is at rest. In order to accomplish this purpose, I have provided an extension 10' on the shaft 10. A gear 200 is slidably splined on the shaft extension, and an expansion spring 202 is provided around the shaft to maintain the gear 200 in engagement with a rack 201 provided on a bar 203. The bar 203 is slidably guided in guides 204 provided in the housing 6. The bar 203 is provided with a rack portion 205 on a side thereof facing the rack 201 but below and in off-set relation thereto. Rotation of the shaft 10 and the gear 200 thereon, when said gear is engaged with the rack 201 on the bar 203, causes the bar 203 to be moved in the direction of the arrow B. The bar 203 is also provided with a rack portion 206 thereon to mesh with a pinion 207 slidably splined on a shaft 208 (see Fig. 17). An end of the shaft 208 projects out thru the wall of the housing 6 and is provided with a cam 209 thereon to engage the under face of the clutch lever 99, for the purpose of lifting said lever extension into the full line position shown in Fig. 16, and disengaging the clutch.

Whenever the movement of the vehicle stops and foot pressure is removed from the first speed ahead pedal 104 and from the reversing pedal 153, the spring 202 causes the gear 200 to be engaged with the rack 201 to move it in the direction of the arrow B, and to swing the cam 209 into the elevated position beneath the lever 99, whereby the clutch is disengaged. If the vehicle operator wishes to have the vehicle move in a forward direction or that of the arrow A, the bar 109 is elevated by pressure applied to the first speed ahead pedal 104. As the bar 109 raises, vertical movement thereof is transmitted thru a sliding pivot 216 to a beam member 214 pivoted intermediate its ends at 215 in the casing 6. The aforesaid vertical movement of the bar 109, thru its contact with the beam 214, causes the shift bar 211 on the gear 200, by a pin 217, to be depressed and to engage the gear 200 with the rack 205, causing said rack 205 to be moved in the direction of the arrow A, and to swing the cam 209 downwardly, to thereby effect the engagement of the engine clutch.

In the event the vehicle would be in the stopped position with the cam 209 raised against the lever 99 to disengage the clutch, and it would be desired to engage the clutch properly to move the vehicle in a reverse direction, or that of the arrow B, the operator would depress the reversing pedal 153, movement of which would be transmitted to the rod 157 and thence thru the bell crank 212 to the bar 211 for moving the gear 200. Downward movement of the gear 200 would disengage it from the upper rack 201 and engage it with the lower rack 205, causing the bar 203 to be moved in the direction of the arrow A, thereby causing the cam 209 to swing from the vertical into the horizontal position and allowing the clutch lever 99 to drop downwardly and cause the engagement of the clutch. The aforesaid operation of moving the clutch from the disengaged into the engaged position in order to reverse the movement of the vehicle, would be synchronized with the movement of the slide block 30, whereby the reversing gears in the transmission would be first engaged before the cam 209 would be swung downward to allow the engine clutch to engage.

The pinion 207 is provided with a collar 218 thereon, within which a shifting fork 219 is confined. The shifting fork is provided with an operating handle 223 thereon, which extends to a point in convenient proximity to the vehicle operator, whereby the pinion 207 may be engaged or disengaged, at the will of the operator, with the rack 206. Thus, by engaging or disengaging the pinion 207 with the rack 206, it is possible to render the selective clutch operative mechanism effectual or ineffectual, as the case may be. A spring 220 and a stop collar 221 are provided around the shaft 208 to force the pinion 207 into engagement with the rack 206. The clutch operating mechanism shown in Fig. 16, would cause the engagement and disengagement of the engine clutch independently of the clutch manipulation effected by the double ended cam 102, and when operating conjointly with said double ended cam 102, would cause the engagement or disengagement of the engine clutch slightly in advance of the double ended cam 102.

In Fig. 12 I have shown a vertical cross-section taken thru an automatic gear shifting mechanism constructed to shift the gears on a standard type of automotive transmission as distinguished from the special type of transmission heretofore described.

In Figs. 10 and 11, I have shown a box 2, containing the conventional type of transmission wherein the propeller shaft 5 may be driven at any one of three selected speeds ahead or one in the reverse direction. The transmission 2 is provided with vertically aligned driving and driven shafts 230 and 231. The transmission 2 is a standard type of gear box, and is provided with the low and reverse gears coupled together to be actuated by a single shifting fork, and also has the intermediate and high gears coupled together, to be operated by a single shifting fork.

In Fig. 11, I have shown two pairs of gears which are representative either of the low-reverse or the intermediate-high combinations. If it be assumed that the gears shown in Fig. 11 are the low-reverse combination, then the shifting fork 232 is indicated as the member for shifting said gears. A similar shifting fork 233 is provided for shifting the intermediate-high speed gears. Each of the shift members 232 and 233 is provided with the respective straps 234 and 235 thereon, each of said straps being mounted around an eccentric 236 secured around an end of the low-reverse shifting shaft 237, and the intermediate-high shift shaft 238 respectively.

The shaft 237 extends within the casing 6' and into a slot 31' located in the slide block 30'. The shift shaft 238 likewise extends into the slot 31' in the slide block 30'. The casing 6' is provided with a pair of guideways 26' and 27' therein, within which the upper and lower edges of the slide block 30' are slidably confined. The slide block 30' has the longitudinal slots 31' and 32' therein. A shaft 100' is journaled in the side of the housing 6', the inner end of said shaft, within the housing, having a clutch operating pinion 101' thereon, to engage the clutch lever extension 99' for engaging and disengaging the engine clutch in the manner heretofore described in the preferred form of the invention.

The clutch operating pinion 101' is located within the slot 32' in the slide block 30'. The clutch operating pinion 101' is also provided with a cam block 94' on a face thereof, whereby the pinion 101' may only rotate a one quarter revolution in the act of engaging and disengaging the engine clutch. The lower edge of the slot 32' is provided with a cam locking surface 41' therealong, and said cam locking surface is interrupted thruout its length by the rack bars 42', 43', 44', and 45', for disengaging and engaging the clutch when moving into and from the low, intermediate, and high speed gears, and also the rack bar 46' for disengaging and engaging the clutch when moving into and from the reverse speed. The lower edge of the upper slot 31' is provided with a cam lock 36' therealong, which surface is interrupted by the gear racks 37' and 38', which are adapted to progressively engage the pinion 91' when shifting the low speed transmission gear into and from engagement, and also a rack 49' for reacting with the pinion 91' to shift the reverse speed gear into and from engagement. The upper edge of the slot 31' is provided with a cam locking surface 33' thereon which surface is interrupted by the gear racks 34' and 40', the rack 34' being used to engage the pinion 92' to engage the intermediate speed gear in the transmission, and the rack 40' to disengage the intermediate speed gear and engage the high speed gear in the transmission. The rack 38' operates in timed relation with the rack 34', whereby the rack 38' will react with the pinion 91' to disengage the low speed gear immediately preceding the act of the rack 34' engaging the pinion 92' to engage the intermediate speed gears. One face of each of the pinions 91' and 92' is provided with a cam 94' on the face thereof, to engage the cam lock 33' to prevent the selection of gears by rotation of the said pinions only at such times as one of the pinions registers with a selected rack portion. The length of the racks 49', 37', 38' and 34', is such that a quarter turn of the pinions 91' and 92' will engage any selected gear in the transmission. However, the gear rack 40' is twice the length of the aforementioned gear racks, thus requiring a half turn of the pinion 92' when disengaging the intermediate speed and engaging the high speed. The locking cam 94' is substantially square, to permit only a quarter turn of the pinions 91' and 92' during the periods when the said pinions are engaged by the actuating gear racks.

On one side of the slide block 30', I have provided driven shafts 20', 22', and 24', which shafts are provided with the respective sleeves 120', 122' and 124', thereon. Each of the sleeves has a gear 125' provided on the upper end thereof, and said gears are adapted to progressively engage the rack portion 126' on one face of the slide block 35. On the opposite side of the slide block 30' I have provided the driven shafts 19', 21', 23' and 25'. Sleeves 50', 51' and 52' are provided on the respective shafts 19', 21' and 23'. The upper end of each of the last mentioned sleeves is provided with a gear 54' thereon progressively engageable with a gear rack 58' on the side of the slide block 30' facing said gears 54'. The sleeves 120' thru 124' are adapted to be elevated in succession to engage the gear 125' thereon with the rack 126', to move the slide block 30' forwardly to effect progressive selection of the transmission speeds ranging from the low speed to the high speed, or any variation thereof. The sleeves 50' thru 52' are adapted to be elevated to engage the gears 54' thereon, to engage the gears with the rack 58' and to move the slide block 30' in the reverse direction to effect a progressive disengagement of the gears, or any variation thereof from the high speed down to the low speed.

The slide block 30' is set in motion in the forward direction, that of the arrow A, by manually elevating the bar 109' thru the first speed ahead pedal, which action results in elevating the driven gear 96' on the shaft 250 into engagement with the gear rack 95' on the slide block 61'. The shaft 250 is driven by a helical gear 8' mounted on said shaft, which meshes with a helical gear 9' on the shaft 7', said shaft 7' being driven by the engine 1. The slide 61' is provided with a roller 59' thereon, which in the forward movement of the slide 61' is adapted to pass under the cam lift 53' on the respective sleeves 120', 122' and 124', to progressively engage the gears 125' on said sleeves, with the rack 126' on the slide block 30', to effect the progressive engagement of the low, intermediate, and high speed gears. The slide 61' is connected by a rod 62'' to a pressure actuated plunger in a cylinder 64'. The plunger in the cylinder is actuated by fluid pressure developed by the speed of the vehicle, as has been heretofore described in connection with the parts appearing in Fig. 3.

In order to disengage the gears and the transmission progressiveley downward from high to low, the slide block 61' is moved rearwardly in the direction of the arrow B to elevate the sleeves 52', 51' and 50', in progressive order, thereby raising the gears 54' on said sleeves into engagement with the gear rack 58', and thereby moving the slide block 30' rearwardly to cause changing of the gears in the transmission from high down to low in progressive order. Obviously, the slide 61' might be stopped to effect continued drive of the vehicle, at either the low, intermediate, or high speeds, by movement of the said slide block in either a forward or rearward direction, by proper manipulation of the valves controlling the movement of the plunger in the cylinder 64'.

Stop pins 115', 115'a, 115'b, and 115'c, are slidably guided within the housing 6', each of said pins being movable into the path of travel of a shoulder 112' on the slide 61'. The stop pins 115', etc., prevent movement of the slide during each phase of disengaging the clutch, engaging or disengaging the low, intermediate, or high speed gears, and re-engaging the clutch. The slide block 30' is provided with a cam 114' thereon, which cooperates to lift the respective stop pins 115' at the end of each shifting phase to clear the engaged stop pin from the shoulder 112' on the slide 61', whereby said slide 61' may move to engage an adjacent stop pin 115' in either the forward or rearward direction.

In order to engage the reversing gear in the transmission, the shift bar 159' is moved downward to engage the gear 151' on the shaft 25' with a gear rack 150' on the slide block 30'. As the slide block 30' moves rearwardly, in the direction of the arrow B, the pinion 91' is turned a quarter turn by the rack 49', thereby shifting the reverse gear of the transmission into mesh. The reverse gear in the transmission is disengaged by releasing the pressure on the bar 159' and allowing the gear 151' to lift into engagement with the rack 170', which engagement causes the slide block 30' to move forwardly in the direction of the arrow A, and rotating the pinion 91' out of engagement with the reverse gear 49'. The sequence of operation between the slide 61', stop pins 115', and slide block 30', is the same in the modified form of the invention as in the preferred embodiment of the invention. The only difference between the preferred and modified forms of the invention is that two pinions are used to accomplish all of the shifts necessary to operate a standard transmission, whereas in the preferred form of the invention, four pinions are required to shift the gears of the special transmission. Hence, with the modification in this construction of the slide blocks 30 and 30', I have corresponding pinions to be operated thereby. The shifting mechanism may be utilized to operate either a special or a standard type of transmission. The drive shaft 7' in the bottom of the casing 6' is provided with helical gears 8' thereon, which mesh with helical gears 11' thru 17' inclusive, mounted on the respective vehicle shafts 19' thru 25' inclusive.

In an automotive vehicle equipped with my gear shifting mechanism, the forward speed thereof, is controlled entirely by the pedal 104, which pedal works in definite relation to the engine throttle 171. A pin 251 is provided on the engine throttle beneath the under side of the pedal 104, so that the swinging movement of the pedal from its normal inoperative position down to a point where it will contact the pin 251, first causes the bar 109 to be elevated and the link 131 on the valve 133 to be lifted, before further downward movement of said pedal 104 reacts with the pin 251, to cause the engine speed to increase to a point where, as the low speed gear in the transmission engages, the vehicle may move in a forward direction. Whenever the low, intermediate, or high speed gears are engaged, the speed of the vehicle is controlled by foot pressure applied to the pedal 104, which reacts both with the engine throttle 171, and also with the slide valve 133, to regulate the position of said valve 133 with respect to the discharge or building up of fluid pressure in the cylinder 63.

Whenever the vehicle engine would stall or for any other cause the vehicle would come to a standstill, it is necessary to bring the gear shifting mechanism back into the starting or neutral position. From the neutral or starting position, the slide block 30 or the slide block 30' may be moved in either the forward or reverse direction. My gear shifting mechanism must be manipulated to a certain extent in the same manner as the conventional gear shifting mechanism on a vehicle, in that a shift cannot be made from the low speed to the reverse speed or vice versa, without causing the movement of the vehicle to be brought to a stop.

A timed relationship is desirable between the ahead pedal 104 and the accelerator 171 and the port openings 135 and 136 in the valve 133, whereby said port openings, to effect the discharge of fluid pressure from the cylinder 64, will be opened to a degree most effective with economical operating speeds of the engine. Specifically, the ahead pedal 104 would be timed to regulate the port openings in the valve 133 and actuate the accelerator 171 so that the vehicle might travel in high speed with a minimum of gas or energy required to run the engine 1.

With particular respect to Fig. 16, the cam 209 may be disengaged from operative relationship with respect to the lever 99, by depressing either the reversing pedal 153 or the ahead pedal 104 to effect movement of the cam 209 into the lowered position and then pulling the lever 233 to demesh the gear 207 from the rack 206, thereby rendering the clutch operating mechanism shown in Fig. 16, inoperative.

The reversing pedal 153 is moved in relation to a pin 261 on the throttle 171, whereby depressing movement of the reverse pedal 153 serves the double purpose of engaging the parts of the mechanism necessary to move the vehicle in reverse and also operates the engine throttle to thereby drive the vehicle at any desired rate of speed in the reverse direction.

In order to indicate to the operator of the vehicle, the gears which may be in mesh, to wit, either the low, intermediate, high or reverse, I have provided an indicator 301 in the operator's compartment, which is connected by a cable 300 to the slide block 30. The movement of the slide block 30, which effects the engagement of the various selective speed gears in the transmission thus causes the cable 300 to be moved in unison therewith, whereby the indicator 301 will register exactly the position of the slide block and hence communicate just which gears in the engine transmission are engaged.

Having thus described this invention, what I claim and desire to secure by Letters Patent is:

1. In combination, an automotive vehicle having a selective speed gear transmission therein and means to automatically select speeds of said gear transmission according to the speed of the vehicle, comprising, individual gear shifting members related to each different change speed gear in said transmission, a single reciprocatable gear in said transmission, a single reciprocatable gear selectively and directly engageable with means selectively and directly engageable with one of said gear shifting members at a time to effect engagement and disengagement of selective speed gears in the transmission; and means operated by the speed of the vehicle and detachably related to said reciprocatable means to control but not to accomplish the movement thereof.

2. In combination with an automotive vehicle having an engine, a selective speed transmission, and wheel propelling shaft therein, of means related to said transmission to automatically select speeds thereof in direct ratio to the speed of the wheel propelling shaft, comprising, individual speed selecting members operatively related to each different change speed gear in the transmission; a single reciprocatable block progressively and directly engageable with any one selected speed selecting member at a time; means driven by the engine to reciprocate said block progressively in a forward or rearward direction in relation to said speed selecting members; and means driven by the vehicle propelling shaft to control but not to accomplish the engagement and disengagement of the block driving means with the block to effect the speed selection in the transmission according to the speed of the wheel propelling shaft.

3. In combination, an automotive vehicle having a selective speed gear transmission therein and means on said transmission to shift selected gears thereof; and means to automatically actuate the gear shifting means in accordance with the speed of the vehicle, comprising, a driving shaft; a plurality of driven shafts operated by said driving shaft and arranged in parallel rows, each of said shafts having a gear slidably splined thereon; a slide block movably mounted between the parallel rows of driven shafts; a gear rack on each of the opposite sides of said slide block; a reciprocatable cam engageable with successive selected gears on the driven shafts to move the same into engagement with a selected gear rack to move the slide block progressively forward or rearward; and coengaging parts on the slide block to actuate the gear shifting means to effect the engagement and disengagement of the transmission gears thru movement of the slide block.

4. In combination, an automotive vehicle having a selective speed gear transmission therein and means on said transmission to shift selected gears thereof; means to automatically actuate the gear shifting means in accordance with the speed of the vehicle, comprising, a driving shaft; a plurality of driven shafts operated by said driving shaft and arranged in parallel rows, each of said shafts having a gear slidably splined thereon; a slide block movably mounted between the parallel rows of driven shafts; a gear rack on each of the opposite sides of said slide block; a reciprocatable cam engageable with successive selected gears on the driven shafts to move the same into engagement with a selected gear rack to move the slide block progressively forward or rearward; and coengaging parts in the slide block to actuate the gear shifting means to effect the engagement and disengagement of the transmission gears thru movement of the slide block; and means to reciprocate said cam in direct proportion to the speed of the vehicle.

5. In combination, an automotive vehicle having a selective speed gear transmission therein and means on said transmission to shift selected gears thereof; means to automatically actuate the gear shifting means in accordance with the speed of the vehicle, comprising, a driving shaft; a plurality of driven shafts operated by said driving shaft and arranged in parallel rows, each of said shafts having a gear slidably splined thereon; a slide block movably mounted between the parallel rows of driven shafts; a gear rack on each of the opposite sides of said slide block; a reciprocatable cam engageable with successive selected gears on the driven shafts to move the same into engagement with a selected gear rack to move the slide block progressively forward or rearward; coengaging parts in the slide block to actuate the gear shifting means to effect the engagement and disengagement of the transmission gears thru movement of the slide block; an enclosed piston connected to said cam adapted to be actuated by a fluid pressure generating pump communicating with said enclosed piston to supply fluid pressure thereto; and means to drive said pump in proportion to the speed of travel of the vehicle whereby the pressure applied against the piston varies between the minimum and maximum accordingly as the speed of the vehicle varies between the minimum and maximum.

6. In combination, an automotive vehicle having a selective speed gear transmission therein and means on said transmission to shift selected gears thereof; means to automatically actuate the gear shifting means in accordance with the speed of the vehicle, comprising, a driving shaft; a plurality of driven shafts operated by said driving shaft and arranged in parallel rows, each of said shafts having a gear slidably splined thereon; a slide block movably mounted between the parallel rows of driven shafts; a gear rack on each of the opposite sides of said slide block; a reciprocatable cam engageable with successive selected gears on the driven shafts to move the same into engagement with a selected gear rack to move the slide block progressively forward or rearward; coengaging parts in the slide block to actuate the gear shifting means to effect the engagement and disengagement of the transmission gears thru movement of the slide block; fluid pressure actuated means to reciprocate the cam in one direction; and spring means to move said cam in the opposite direction.

7. In combination, an automotive vehicle having a selective speed gear transmission therein and means on said transmission to shift selected gears thereof; means to automatically actuate the gear shifting means in accordance with the speed of the vehicle, comprising, a driving shaft; a plurality of driven shafts operated by said driving shaft and arranged in parallel rows, each of said shafts having a gear slidably splined thereon; a slide block movably mounted between the parallel rows of driven shafts; a gear rack on each of the opposite sides of said slide block; a reciprocatable cam engageable with successive selected gears on the driven shafts to move the same into engagement with a selected gear rack to move the slide block progressively forward or rearward; coengaging parts in the slide block to actuate the gear shifting means to effect the engagement and disengagement of the transmission gears thru movement of the slide block; and fluid pressure actuated means to move the cam within the minimum and maximum limits of its reciprocative stroke accordingly as the speed of the vehicle varies between the minimum and maximum.

8. In combination, an automotive vehicle having a selective speed gear transmission therein and means on said transmission to shift selected gears thereof; means to automatically actuate the gear shifting means in accordance with the speed of the vehicle, comprising, a driving shaft; a plurality of driven shafts operated by said driving shaft and arranged in parallel rows, each of said shafts having a gear slidably splined thereon; a slide block movably mounted between the parallel rows of driven shafts; a gear rack on each of the opposite sides of said slide block; a reciprocatable cam engageable with successive selected gears on the driven shafts to move the same into engagement with a selected gear rack to move the slide block progressively forward or rearward; coengaging parts on the slide block to actuate the gear shifting means to effect the engagement and disengagement of the transmission gears thru movement of the slide block; a closed cylinder; a piston in said cylinder connected to said cam; a fluid pressure generating pump communicating with said cylinder to create fluid pressure to reciprocate said piston and cam in unison; a primary valve to regulate the volume of fluid pressure to be accumulated in said cylinder for effecting selective reciprocative movements of the piston; and means to control the movement of said valve.

9. In combination, an automotive vehicle having a selective speed gear transmission therein and means on said transmission to shift selected gears thereof; means to automatically actuate the gear shifting means in accordance with the speed of the vehicle, comprising, a driving shaft; a plurality of driven shafts operated by said driving shaft and arranged in parallel rows, each of said shafts having a gear slidably splined thereon; a slide block movably mounted between the parallel rows of driven shafts; a gear rack on each of the opposite sides of said slide block; a reciprocatable cam engageable with successive selected gears on the driven shafts to move the same into engagement with a selected gear rack to move the slide block progressively forward or rearward; coengaging parts in the slide block to actuate the gear shifting means to effect the engagement and disengagement of the transmission gears thru movement of the slide block; a closed cylinder; a piston in said cylinder connected to said cam; a fluid pressure generating pump communicating with said cylinder to create fluid pressure to reciprocate said piston and cam in unison; a primary valve to regulate the volume of fluid pressure to be accumulated in said cylinder for effecting selective reciprocative movements of the piston; means to control the movement of said valve; and a secondary valve to discharge the fluid pressure from the cylinder independent of the primary valve.

10. In combination, an automotive vehicle having a selective speed gear transmission therein and means on said transmission to shift selected gears thereof; means to automatically actuate the gear shifting means in accordance with the speed of the vehicle, comprising, a driving shaft; a plurality of driven shafts operated by said driving shaft and arranged in parallel rows, each of said shafts having a gear slidably splined thereon; a slide block movably mounted between the parallel rows of driven shafts; a gear rack on each of the opposite sides of said slide block; a reciprocatable cam engageable with successive selected gears on the driven shafts to move the same into engagement with a selected gear rack to move the slide block progressively forward or rearward; coengaging parts in the slide block to actuate the gear shifting means to effect engagement and disengagement of the transmission gears thru movement of the slide block; an enclosed piston connected to said cam adapted to be actuated by a fluid pressure generating pump communicating with said enclosed piston to supply fluid pressure thereto; means to drive said pump in proportion to the speed of travel of the vehicle whereby the pressure applied against the piston varies between the minimum and maximum accordingly as the speed of the vehicle varies between the minimum and maximum; and means to discommunicate the fluid pressure from contact with the piston.

11. In combination, an automotive vehicle having a selective speed gear transmission therein and means on said transmission to shift selected gears thereof; means to automatically actuate the gear shifting means in accordance with the speed of the vehicle, comprising, a driving shaft; a plurality of driven shafts operated by said driving shaft and arranged in parallel rows, each of said shafts having a gear slidably splined thereon; a slide block movably mounted between the parallel rows of driven shafts; a gear rack on each of the opposite sides of said slide block; a reciprocatable cam engageable with successive selected gears on the driven shafts to move the same into engagement with a selected gear rack to move the slide block progressively forward or rearward; coengaging parts on the slide block to actuate the gear shifting means to effect the engagement and disengagement of the transmission gears thru movement of the slide block; a closed cylinder; a piston in said cylinder connected to said cam; a fluid pressure generating pump communicating with said cylinder to create fluid pressure to reciprocate said piston and cam in unison; a primary valve to regulate the volume of fluid pressure to be accumulated in said cylinder for effecting selective reciprocative movements of the piston; means to control the movement of said valve; and spring means to move the piston in a direction opposite to that in which the piston is moved by the fluid pressure when the fluid pressure drops from the maximum to the minimum.

12. In combination, an automotive vehicle having a selective speed gear transmission therein and means on said transmission to shift selected gears thereof; means to automatically actuate the gear shifting means in accordance with the speed of the vehicle, comprising, a driving shaft; a plurality of driven shafts operated by said driving shaft and arranged in parallel rows, each of said shafts having a gear slidably splined thereon; a slide block movably mounted between the parallel rows of driven shafts; a gear rack on each of the opposite sides of said slide block; a reciprocatable cam engageable with successive selected gears on the driven shafts to move the same into engagement with a selected gear rack to move the slide block progressively forward or rearward; coengaging parts in the slide block to actuate the gear shifting means to effect the engagement and disengagement of the transmission gears thru movement of the slide block; an enclosed piston connected to said cam adapted to be actuated by a fluid pressure generating pump communicating with said enclosed piston to supply fluid pressure thereto; means to drive said pump in proportion to the speed of travel of the vehicle whereby the pressure applied against the piston varies between the minimum and maximum accordingly as the speed of the vehicle varies between the minimum and maximum; and spring means to move the piston in a direction opposite to that in which the piston is moved by the fluid pressure when the fluid pressure drops from the maximum to the minimum.

13. In combination, an automotive vehicle having an engine, a selective speed transmission, wheel driving means connected to said transmission, a clutch interposed between said engine and transmission; and means to automatically engage and disengage the engine clutch, comprising, a slidable block engageable with the clutch operating mechanism to disengage the clutch at times and to engage said clutch at other times; means driven by the engine to cause the movement of said slide block; and means driven by the wheel driving means to effect the engagement and disengagement of the slide block moving means with the slide block.

14. In combination, an automotive vehicle having an engine, a selective speed transmission, wheel driving means connected to said transmission, a clutch interposed between said engine and transmission; a lever related to said clutch to operate the clutch to make and break driving connection between the engine and transmission thru the clutch; means to actuate said clutch lever, comprising, a slide block; a cam to be rotated by movement of the slide block into and from engagement with the clutch lever to effect the engagement and disengagement of the clutch; means driven by the engine to cause the movement of said slide block; and means driven by the wheel driving means to effect the engagement and disengagement of the slide block moving means with the slide block.

15. In combination, an automotive vehicle having an engine, a selective speed transmission, wheel driving means connected to said transmission, a clutch interposed between said engine and transmission; a lever related to said clutch to operate the clutch to make and break driving connection between the engine and transmission thru the clutch; means to actuate said clutch lever, comprising, a slide block; a cam to be rotated by movement of the slide block into and from engagement with the clutch lever to effect the engagement and disengagement of the clutch; means driven by the engine to cause the movement of said slide block; means driven by the wheel driving means to effect the engagement and disengagement of the slide block moving means with the slide block; and means to automatically regulate the swing of the clutch operating lever when moving the clutch from the disengaged to the engaged positions.

16. In combination, an automotive vehicle having an engine, a selective speed transmission; individual gear shifting means on each of the different change speed gears in said transmission, wheel driving means connected to said transmission, a clutch interposed between said engine and transmission; means to automatically engage and disengage the engine clutch and to automatically actuate the gear shifting means in accordance with the speed of the vehicle, comprising, a slidable block engageable with the clutch operating mechanism to disengage the clutch at times and to engage said clutch at other times, and to engage and disengage gears of selected speeds thru the individual gear shifting means; means driven by the engine to cause the movement of said slide block; and means driven by the wheel driving means to control but not to accomplish the engagement and disengagement of the slide block moving means with the slide block.

17. In combination with an automotive vehicle having an engine, a selective speed transmission, and wheel propelling shaft therein, of means related to said transmission to automatically select speeds thereof in direct ratio to the movement of the vehicle in the forward direction, comprising, speed selecting members operatively related to the transmission; a reciprocatable block progressively and directly engageable with any selected speed selecting member at a time to effect successively increasing or decreasing speeds of the vehicle in a forward direction; means driven by the engine to reciprocate said block progressively in a forward or rearward direction in relation to said speed selecting members; means driven by the vehicle propelling shaft to control but not to accomplish the engagement and disengagement of the block driving means with the block to effect the speed selection in the transmission according to the speed of the wheel propelling shaft; and means to move the block in a reverse direction by the block driving means to actuate the reverse speed driving member in the transmission.

18. In combination, an automotive vehicle having a selective speed gear transmission therein and means on said transmission to shift selected gears thereof; means to automatically actuate the gear shifting means in accordance with the speed of the vehicle, comprising, a driving shaft; a plurality of driven shafts operated by said driving shaft and arranged in parallel rows, each of said shafts having a gear slidably splined thereon; a slide block movably mounted between the parallel rows of driven shafts; a gear rack on each of the opposite sides of said slide block; a reciprocatable cam engageable with successive selected gears on the driven shafts to move the same into engagement with a selected gear rack to move the slide block progressively forward or rearward; coengaging parts in the slide block to actuate the gear shifting means to effect the engagement and disengagement of the transmission gears thru movement of the slide block; an enclosed piston connected to said cam adapted to be actuated by a fluid pressure generating pump communicating with said enclosed piston to supply fluid pressure thereto; means to drive said pump in proportion to the speed of travel of the vehicle whereby the pressure applied against the piston varies between the minimum and maximum accordingly as the speed of the vehicle varies between the minimum and maximum; and means to move said slide block in a reverse direction to and from a position of rest, comprising, a facing pair of off-set gear racks on the slide block; a gear on one of said driven shafts selectively engageable with either of said gear racks to move the slide block to and from the position of rest in a rearward direction; and coengaging parts on the slide block to actuate the reverse gear shifting means to effect the engagement and disengagement of the transmission reversing gears thru movement of the slide block.

19. In combination, an automotive vehicle having an engine, a selective speed transmission, wheel driving means connected to said transmission, a clutch interposed between said engine and transmission; a lever related to said clutch to operate the clutch to make and break driving connection between the engine and transmission thru the clutch; means to actuate said clutch lever, comprising, an oscillatable cam to raise and lower said clutch lever; a reciprocatable rack to oscillate said cam; a facing pair of off-set gear racks on said last mentioned rack; and a driven gear selectively engageable with either of said facing gear racks to reciprocate the cam oscillating rack in opposite directions.

20. In combination, an automotive vehicle having an engine, a selective speed transmission, wheel driving means connected to said transmission, a clutch interposed between said engine and transmission; a lever related to said clutch to operate the clutch to make and break driving connection between the engine and transmission thru the clutch; means to actuate said clutch lever, comprising an oscillatable cam to raise and lower said clutch lever; a reciprocatable rack to oscillate said cam; a facing pair of off-set gear racks on said last mentioned rack; a driven gear selectively engageable with either of said facing gear racks to reciprocate the cam oscillating rack in opposite directions; and manual means to engage and disengage the oscillatable cam with the reciprocatable rack 21. In combination, an automotive vehicle having a selective speed gear transmission therein and means to automatically select speeds of said gear transmission according to the speed of the vehicle, comprising individual gear shifting members related to each different change speed gear in said transmission; a single reciprocable means selectively and directly engageable with one of said gear shifting members at a time to effect engagement and disengagement of selective speed gears in the transmission; a cam detachably related to said reciprocatable means to control but not to accomplish the movement thereof; an enclosed piston connected to said cam adapted to be actuated by a fluid pressure generating pump communicating with said enclosed piston to supply fluid pressure thereto; and means to drive said pump in proportion to the speed of travel of the vehicle, whereby the pressure applied against the piston varies between the minimum and maximum accordingly as the speed of the vehicle varies between the minimum and maximum.

22. In combination, an automotive vehicle having a selective speed gear transmission therein and means to automatically select speeds of said gear transmission according to the speed of the vehicle, comprising individual gear shifting members related to each different change speed gear in said transmission; a single reciprocable means selectively and directly engageable with one of said gear shifting members at a time to effect engagement and disengagement of selective speed gears in the transmission; a cam detachably related to said reciprocable means to control but not to accomplish the movement thereof; an enclosed piston connected to said cam adapted to be actuated by a fluid pressure generating pump communicating with said enclosed piston to supply fluid pressure thereto; means to drive said pump in proportion to the speed of travel of the vehicle whereby the pressure applied against the piston varies between the minimum anad maximum accordingly as the speed of the vehicle varies between the minimum and maximum; and a valve operable by the reciprocatable means at times to discommunicate the fluid pressure from the enclosed piston.

23. In combination, an automotive vehicle having a selective speed gear transmission therein and means to automatically select speeds of said gear transmission according to the speed of the vehicle, comprising individual gear shifting members related to each different change speed gear in said transmission, a single reciprocatable means selectively and directly engageable with said gear shifting members at a time to effect engagement and disengagement of selective speed gears in the transmission; means operated by the speed of the vehicle and detachably related to said reciprocatable means to control but not to accomplish the movement thereof; and an indicator operated by the reciprocatable means to visually indicate which of the transmission gears are engaged.

24. In combination, an automotive vehicle having an engine, a selective speed transmission, wheel driving means connected to said transmission, a clutch interposed between said engine and transmission and means to automatically engage and disengage the engine clutch, comprising a slidable block engageable with the clutch operating mechanism to disengage the clutch at times and to engage said clutch at other times; means operated by the clutch disengaging mechanism to render the engine throttle inoperative when the clutch is disengaged; means driven by the engine to cause the movement of said slide block; and means driven by the wheel driving means to effect the engagement and disengagement of the slide block moving means with the slide block.

25. In combination, an automotive vehicle having a selective speed gear transmission therein and means to automatically select speeds of said gear transmission according to the speed of the vehicle, comprising individual gear shifting members related to each different change speed gear in said transmission, a single movable means selectively and directly engageable with one of said gear shifting members at a time to effect engagement and disengagement of selective speed gears in the transmission; and means operated by the speed of the vehicle and detachably related to said movable means to control but not to accomplish the movement thereof.

26. In combination, an automotive vehicle having a selective speed gear transmission therein and means on said transmission to shift selected gears thereof; and means to automatically actuate the gear shifting means in accordance with the speed of the vehicle, comprising, a driving shaft; a plurality of driven shafts operated by said driving shaft and arranged in parallel rows, each of said shafts having a gear slidably mounted splined thereon; a member movably mounted between the parallel rows of driven shafts; a gear rack on each of the opposite sides of said member; a reciprocatable cam engageable with successive selected gears on the driven shafts to move the same into engagement with a selected gear rack to move the member progressively forward or rearward; and coengaging parts on the member to actuate the gear shifting means to effect the engagement and disengagement of the transmission gears thru movement of the member.

27. In combination, an automotive vehicle having a selective speed gear transmission therein and means to automatically select speeds of said gear transmission according to the speed of the vehicle, comprising individual gear shifting members related to each different change speed gear in said transmission, a single movable means selectively and directly engageable with said gear shifting members at a time to effect engagement and disengagement of selective speed gears in the transmission; means operated by the speed of the vehicle and detachably related to said movable means to control but not to accomplish the movement thereof.

28. In combination, an automotive vehicle having an engine, a selective speed transmission, wheel driving means connected to said transmission, a clutch interposed between said engine and transmission, a lever related to said clutch to operate the clutch to make and break driving connection between the engine and transmission thru the clutch; means to actuate said clutch lever, comprising, a movable member; a cam to be rotated by movement of the movable member into and from engagement with the clutch lever to effect the engagement and disengagement of the clutch; means driven by the engine to cause the movement of said movable member; means driven by the wheel driving means to effect the engagement and disengagement of the movable member moving means with the movable member; and means to automatically regulate the swing of the clutch operating lever when moving the clutch from the disengaged to the engaged positions.

29. In combination, an automotive vehicle having an engine, a selective speed transmission; an individual gear shifting means on each of the different change speed gears in said transmission, wheel driving means connected to said transmission, a clutch interposed between said engine and transmission; means to automatically engage and disengage the engine clutch and to automatically actuate the gear shifting means in accordance with the speed of the vehicle, comprising, a movable member engageable with the clutch operating mechanism to disengage the clutch at times and to engage said clutch at other times, and to engage and disengage gears of selected speeds thru the individual gear shifting means; means driven by the engine to cause the movement of said movable member; and means driven by the wheel driving means to control but not to accomplish the engagement and disengagement of the movable member moving means with the movable member.

30. In combination, an automotive vehicle having an engine, a selective speed transmission, wheel driving means connected to said transmission, a clutch interposed between said engine and transmission, a lever related to said clutch to operate the clutch to make and break driving connection between the engine and transmission thru the clutch; means to actuate said clutch lever, comprising, an oscillatable cam to raise and lower said clutch lever; a movable member to oscillate said cam; means to move said member in opposite directions; and manual means to engage and disengage said last mentioned means with the movable member.

31. In combination, an automotive vehicle having a selective speed gear transmission therein and means to automatically select speeds of said gear transmission according to the speed of the vehicle, comprising individual gear shifting members related to each different change speed gear in said transmission, a single movable means selectively and directly engageable with one of said gear shifting members at a time to effect engagement and disengagement of selective speed gears in the transmission; means to initiate movement of the movable means manually; and means operated by the speed of the vehicle and detachably related to said movable means to control but not to accomplish the movement thereof, automatically after the initial manual movement.

32. In combination, an automotive vehicle having a selective speed gear transmission therein and means to automatically select speeds of said gear transmission according to the speed of the vehicle, comprising, individual gear shifting members related to each different change speed gear in said transmission, a single reciprocatable means selectively and directly engagable with one of said gear shifting members at a time to effect engagement and disengagement of selective speed gears in the transmission; means to initiate movement of the movable means manually; and means operated by the speed of the vehicle and detachably related to said reciprocatable means to control but not to accomplish the movement thereof automatically after the initial manual movement.

33. In combination, an automotive vehicle having a selective speed gear transmission therein and means to automatically select speeds of said gear transmission according to the speed of the vehicle, comprising individual gear shifting members related to each different change speed gear in said transmission, a single movable means selectively and directly engageable with one of said gear shifting members at a time to effect engagement and disengagement of selective speed gears in the transmission; means operated by the speed of the vehicle and detachably related to said movable means to control but not to accomplish the movement thereof; and means operatively related to said last mentioned means to prevent movement thereof whenever the movable means is effecting the engagement and disengagement of selective speed gears of the transmission.

34. In combination, an automotive vehicle having a selective speed gear transmission therein and means to automatically select speeds of said gear transmission according to the speed of the vehicle, comprising individual gear shifting members related to each different change speed gear in said transmission, a single reciprocatable means selectively and directly engageable with one of said gear shifting members at a time to effect engagement and disengagement of selective speed gears in the transmission; means operated by the speed of the vehicle and detachably related to said reciprocatable means to control but not to accomplish the movement thereof; and means operatively related to said last mentioned means to prevent movement thereof whenever the movable means is effecting the engagement and disengagement of selective speed gears of the transmission.

35. In combination, an automotive vehicle having a selective speed gear transmission therein and means to automatically select speeds of said gear transmission according to the speed of the vehicle, comprising individual gear shifting members related to the different change speed gears in said transmission; a reciprocating member selectively and directly engageable with one of said gear shifting members at a time to effect engagement and disengagement of selective speed gears in the transmission; a cam detachably related to said movable member to control but not to accomplish the movement thereof; an enclosed piston connected to said cam adapted to be actuated by a fluid pressure generating pump communicating with said enclosed piston to supply fluid pressure thereto; means to drive said pump in proportion to the speed of travel of the vehicle, whereby the pressure applied against the piston varies between the minimum and maximum accordingly as the speed of the vehicle varies between the minimum and maximum; and a valve to control the discharge of fluid pressure from the cylinder whereby any selected change speed gear may be held in engagement regardless of the speed of the vehicle.

36. In combination, an automotive vehicle having an engine, a selective speed transmission, wheel driving means connected to said transmission, a lever related to said clutch to operate the clutch to make and break driving connection between the engine and transmission through the clutch, means to actuate said clutch lever comprising an oscillatable cam to raise and lower said clutch lever; a movable member to oscillate said cam; and means of connection between said movable member and the accelerator control of the engine, whereby the application of pressure to the accelerator control moves the movable member and the oscillatable cam and the clutch lever to engage the clutch, and the release of pressure from the accelerator control moves the movable member and the oscillatable cam to cause the clutch lever to disengage the clutch.

37. In combination, an automotive vehicle having an engine, a selective speed transmission, wheel driving means connected to said transmission, a clutch interposed between said engine and transmission and means to automatically engage and disengage the engine clutch, comprising a movable member engageable with the clutch operating mechanism to disengage the clutch at times and to engage said clutch at other times; means operated by the clutch disengaging mechanism to disconnect the fuel supply to the engine when the clutch is disengaged; means driven by the engine to cause the movement of the movable member; means driven by the wheel driving means to effect the engagement and disengagement of the movable member moving engagement with the movable member; and means independent of the movable member clutch operating mechanism to engage the clutch prior to and to disengage the clutch subsequent to movement of the movable member, said last mentioned clutch operating means being inoperative when the clutch operating mechanism is actuated by the movable member.

38. In combination, an automotive vehicle having a selective speed gear transmission therein and means to automatically select speeds of said gear transmission according to the speed of the vehicle, comprising individual gear shifting members related to the different change speed gears in said transmission; a reciprocatory member selectively and directly engageable with one of said gear shifting members at a time to effect engagement and disengagement of selective speed gears in the transmission; a cam detachably related to said movable member to control but not to accomplish the movement thereof; an enclosed piston connected to said cam adapted to be actuated by a fluid pressure generating pump communicating with said enclosed piston to supply fluid pressure thereto; means to drive said pump in proportion to the speed of travel of the vehicle, whereby the pressure applied against the piston varies between the minimum and maximum accordingly as the speed of the vehicle varies between the minimum and maximum; and a valve having control means connected to the engine speed controlling means, said valve being associated with the means to regulate the discharge of fluid pressure, whereby when the speed of the engine and the vehicle drops to the minimum, the said valve automatically holds the fluid pressure to the maximum.

39. In combination, an automotive vehicle having a selective speed gear transmission therein and means to automatically select speeds of said gear transmission according to the speed of the vehicle, comprising individual gear shifting members related to the different change speed gears in said transmission; a reciprocatory means selectively and directly engageable with one of said gear shifting members at a time to effect engagement and disengagement of selective speed gears in the transmission; means operated by the speed of the vehicle and detachably related to said movable means to control but not to accomplish the movement thereof; means to move said reciprocatory movable means in reverse direction; and driving means actuated by said reciprocatory means to actuate the reverse speed driving member in the transmission.

40. In combination, an automotive vehicle having a selective speed gear transmission therein and means to automatically select speeds of said gear transmission according to the speed of the vehicle, comprising individual gear shifting members related to the different change speed gears in said transmission, a reciprocatory means selectively and directly engageable with one of said gear shifting members at a time to effect engagement and disengagement of selective speed gears in the transmission; means to initiate movement of the movable means manually; and means operated by the speed of the vehicle and detachably related to reciprocatory means to control but not to accomplish the movement thereof, automatically after the initial manual movement.

41. In combination, an automotive vehicle having an engine, a selective speed gear transmission therein; and means to automatically select speeds of said transmission according to the speed of the vehicle, comprising gear shifting members related to the different change speed gears in said transmission, a reciprocatory means selectively and directly engageable with one of said gear shifting members at a time to effect engagement and disengagement of selective speed gears in the transmission; means operated by the speed of the vehicle and detachably related to said reciprocatory means to control but not to accomplish the movement thereof; and means with connections leading therefrom to the fuel supply means on the engine and to said reciprocatory means to admit an increased quantity of fuel to the engine after said gears have been engaged and to admit a decreased quantity of fuel to the engine after said gears have been disengaged.

42. In combination, an automotive vehicle having a selective speed gear transmission therein and means to automatically select speeds of said gear transmission according to the speed of the vehicle, comprising individual gear shifting members related to the different change speed gears in said transmission; a reciprocating member selectively and directly engageable with one of said gear shifting members at a time to effect engagement and disengagement of selective speed gears in the transmission; a cam detachably related to said movable member to control but not to accomplish the movement thereof; means connected to said cam operated by a fluid pressure mechanism in proportion to the speed of travel of the vehicle, whereby the pressure applied against said fluid varies between the minimum and maximum accordingly as the speed of the vehicle varies between the minimum and maximum to control but not to accomplish movement thereof.

43. In combination an automotive vehicle having a selective speed gear transmission therein and means to automatically select speeds of said gear transmission according to the speed of the vehicle, comprising individual gear shifting members, related to the different change speed gears in said transmission; a reciprocatory means selectively and directly engageable with one of said gear shifting members at a time to effect engagement and disengagement of selective speed gears in the transmission; means operated by the speed of the vehicle and detachably related to said reciprocating means to control but not to accomplish the movement thereof; and means to actuate a reverse speed driving member in the transmission comprising a connection to the accelerator control of the engine, whereby the application of pressure to the accelerator control moves said means to effect the engagement of the reverse speed driving member in the transmission, and the release of the pressure from the accelerator control moves said means to disengage the reverse speed driving member in the transmission.

44. In combination, an automotive vehicle having a selective speed gear transmission therein and means to automatically select speeds of said gear transmission according to the speed of the vehicle, comprising individual gear shifting members related to each different change speed gear in said transmission; a single reciprocable means selectively and directly engageable with one of said gear shifting members at a time to effect engagement and disengagement of selective speed gears in the transmission; a cam detachably related to said reciprocable means to control but not to accomplish the movement thereof; an enclosed piston connected to said cam adapted to be actuated by a fluid pressure generating pump communicating with said enclosed piston to supply fluid pressure thereto; means to drive said pump in proportion to the speed of travel of the vehicle, whereby the pressure applied against the piston varies between the minimum and maximum accordingly as the speed of the vehicle varies between the minimum and maximum; and means to control the application and discharge of fluid pressure to the enclosed piston.

45. In combination, an automotive vehicle having a selective speed gear transmission therein and means to automatically select speeds of said gear transmission according to the speed of the vehicle, comprising individual gear shifting members related to the different change speed gears in said transmission; a reciprocatory member selectively and directly engageable with one of said gear shifting members at a time to effect engagement and disengagement of selective speed gears in the transmission; a cam detachably related to said movable member to control but not to accomplish the movement thereof; an enclosed piston connected to said cam adapted to be actuated by a fluid pressure generating pump communicating with said enclosed piston to supply fluid pressure thereto; means to drive said pump in proportion to the speed of travel of the vehicle, whereby the pressure applied against the piston varies between the minimum and maximum accordingly as the speed of the vehicle varies between the minimum and maximum; and a manually controlled valve to control the discharge of fluid pressure from the cylinder whereby any selected change speed gear may be held or changed from the maximum speed gear to the minimum speed gear regardless of the speed of the vehicle.

JOSEPH GRISENTI.